United States Patent
Lin et al.

(10) Patent No.: US 11,851,073 B2
(45) Date of Patent: Dec. 26, 2023

(54) FAULT ISOLATION AND MITIGATION UPON LANE MARKING MISDETECTION ON ROADWAYS

(71) Applicant: GM GLOBAL TECHNOLOGY OPERATIONS LLC, Detroit, MI (US)

(72) Inventors: Wen-Chiao Lin, Rochester Hills, MI (US); Zhongyu Yang, Farmington Hills, MI (US); Yao Hu, Sterling Heights, MI (US); Xinyu Du, Oakland Township, MI (US); Yilu Zhang, Northville, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 105 days.

(21) Appl. No.: 17/557,156

(22) Filed: Dec. 21, 2021

(65) Prior Publication Data

US 2023/0192103 A1    Jun. 22, 2023

(51) Int. Cl.
| | |
|---|---|
| *B60W 50/00* | (2006.01) |
| *B60W 50/02* | (2012.01) |
| *B60W 30/12* | (2020.01) |
| B60W 50/029 | (2012.01) |

(52) U.S. Cl.
CPC ............ *B60W 50/02* (2013.01); *B60W 30/12* (2013.01); *B60W 50/0225* (2013.01); *B60W 2050/0072* (2013.01); *B60W 2050/021* (2013.01); *B60W 2050/0215* (2013.01); *B60W 2050/0297* (2013.01); *B60W 2552/53* (2020.02); *B60W 2555/20* (2020.02)

(58) Field of Classification Search
CPC .. B60W 50/02; B60W 30/12; B60W 50/0225; B60W 2050/0072; B60W 2050/021; B60W 2050/0215; B60W 2050/0297; B60W 2552/53; B60W 2555/20
See application file for complete search history.

(56) References Cited

U.S. PATENT DOCUMENTS

| | | |
|---|---|---|
| 6,768,935 B1 | 7/2004 | Morgan et al. |
| 8,054,084 B2 | 11/2011 | Schulz et al. |
| 8,082,776 B2 | 12/2011 | Halalay et al. |
| 8,260,486 B2 | 9/2012 | Salman et al. |
| 8,471,589 B2 | 6/2013 | Zhang et al. |
| 8,577,663 B2 | 11/2013 | Lu et al. |
| 9,018,881 B2 | 4/2015 | Mao et al. |
| 9,097,767 B2 | 8/2015 | Howell et al. |

(Continued)

*Primary Examiner* — Ian Jen

(57) ABSTRACT

A system for a vehicle includes a plurality of sensors onboard the vehicle and a controller. A first sensor of the plurality of sensors is configured to detect lane markings on a roadway. The controller is configured to store data from the plurality of sensors. In response to receiving an indication indicating a misdetection of lane markings on the roadway based on data received from the first sensor, the controller is configured to execute in parallel a plurality of procedures configured to detect a plurality of causes for the misdetection of lane markings, respectively, based on the stored data; isolate one of the causes as a root cause for the misdetection of lane markings; and provide a response for mitigating the misdetection of lane markings on the roadway based on the root cause for the misdetection of lane markings.

20 Claims, 14 Drawing Sheets

(56) References Cited

U.S. PATENT DOCUMENTS

| | | |
|---|---|---|
| 9,231,515 B2 | 1/2016 | Mao et al. |
| 10,215,148 B2 | 2/2019 | Jiang et al. |
| 10,337,438 B2 | 7/2019 | Jiang et al. |
| 11,542,786 B2 * | 1/2023 | Hinderliter ......... E21B 41/0085 |
| 11,578,577 B2 * | 2/2023 | Hinderliter ............. H02B 1/24 |
| 2007/0078576 A1 | 4/2007 | Salman et al. |
| 2011/0295459 A1 | 12/2011 | Shin et al. |
| 2012/0166878 A1 | 6/2012 | Sinha et al. |
| 2012/0200298 A1 | 8/2012 | Zhang et al. |
| 2012/0259570 A1 | 10/2012 | Zhang et al. |
| 2019/0392656 A1 | 12/2019 | Sarwar et al. |
| 2021/0129615 A1 | 5/2021 | Du et al. |

\* cited by examiner

FAULT ISOLATION AND MITIGATION UPON LANE MARKING MISDETECTION ON ROADWAYS

INTRODUCTION

The information provided in this section is for the purpose of generally presenting the context of the disclosure. Work of the presently named inventors, to the extent it is described in this section, as well as aspects of the description that may not otherwise qualify as prior art at the time of filing, are neither expressly nor impliedly admitted as prior art against the present disclosure.

The present disclosure relates generally to vehicle control systems and more particularly to fault isolation and mitigation upon misdetection of lane markings on roadways.

Nowadays, many vehicles are equipped with lane departure warning systems to assist drivers. For example, the lane departure warning systems include sensors such as cameras that monitor lane markings and warn drivers when a vehicle tends to deviate from its lane. Specifically, data from these sensors is processed to determine whether the vehicle is maintaining a lane and to detect when the vehicle departs from the lane. The driver is warned when the vehicle departs from the lane. Some vehicles are also equipped with perception systems including sensors such as cameras, radars, and Lidar that monitor surroundings of vehicles and assist drives in tasks such as parking the vehicles, changing lanes, and so on.

SUMMARY

A system for a vehicle comprises a plurality of sensors onboard the vehicle and a controller. A first sensor of the plurality of sensors is configured to detect lane markings on a roadway. The controller is configured to store data from the plurality of sensors. In response to receiving an indication indicating a misdetection of lane markings on the roadway based on data received from the first sensor, the controller is configured to execute in parallel a plurality of procedures configured to detect a plurality of causes for the misdetection of lane markings, respectively, based on the stored data; isolate one of the causes as a root cause for the misdetection of lane markings; and provide a response for mitigating the misdetection of lane markings on the roadway based on the root cause for the misdetection of lane markings.

In other features, the procedures are configured to detect whether the misdetection of lane markings is caused by any of: the first sensor being faulty; absence of lane markings on the roadway; presence of rain or snow obscuring lane markings on the roadway; presence of glare or shade obscuring lane markings on the roadway; presence of an obstacle in a field of view of the first sensor; presence of construction on the roadway; a change in lane configuration of the roadway; and the roadway being unpaved.

In other features, the response includes following a second vehicle ahead of the vehicle, informing an occupant of the vehicle to take over control of driving the vehicle, switching to a second sensor of the plurality of sensors for lane marking detection, and/or scheduling service.

In other features, one of the procedures executed by the controller is configured to: process an image captured by the first sensor; perform clustering and filtering of pixels in the image; perform first and second curve fittings on the filtered pixels; and determine whether a lane marking exists on the roadway based on the second curve fitting.

In other features, one of the procedures executed by the controller is configured to: process images captured by two sensors of the plurality of sensors; determine, for each of the two sensors, number of images with and without lane markings; calculate, for each of the two sensors, a ratio of the number of images with or without lane markings to a total number of processed images; and determine whether a lane marking exists on the roadway based on the ratios for the two sensors.

In other features, one of the procedures executed by the controller is configured to confirm whether the first sensor is faulty by comparing a raw image of the roadway captured by the first sensor to a raw image of the roadway captured by a second sensor of the plurality of sensors.

In other features, one of the procedures executed by the controller is configured to confirm whether the first sensor is faulty by comparing an objected detected in an image of the roadway captured by the first sensor to an object detected in an image of the roadway captured by a second sensor of the plurality of sensors.

In other features, one of the procedures executed by the controller is configured to detect whether the roadway is unpaved based on images captured by the first sensor, map information about the roadway, and data from an inertial measurement unit in the vehicle.

In other features, one of the procedures executed by the controller is configured to detect presence of rain or snow in images captured by the first sensor using a machine learning model.

In other features, one of the procedures executed by the controller is configured to detect presence of glare or shade in images captured by the first sensor based on intensity of pixels in the images.

In other features, one of the procedures executed by the controller is configured to detect presence of construction on the roadway based on construction objects detected in images captured by one of the plurality of sensors.

In other features, one of the procedures executed by the controller is configured to detect a change in lane configuration of the roadway by detecting at least one of a change in number of lanes in the roadway and a change in a relationship between the number of lanes and a lane occupied by the vehicle.

In other features, one of the procedures executed by the controller is configured to determine, based on images captured by a second sensor of the plurality of sensors and data received from a third sensor of the plurality of sensors, whether a second vehicle is ahead of the vehicle within a predetermined distance from the vehicle and a size of the second vehicle.

In other features, one of the procedures executed by the controller is configured to determine whether to follow the second vehicle based on the predetermined distance.

In other features, one of the procedures executed by the controller is configured to determine whether to drive the drive on another trajectory in response to the predetermined distance being greater than a predetermined distance.

In still other features, a method for a vehicle comprises storing data from a plurality of sensors onboard the vehicle; and receiving an indication indicating a misdetection of lane markings on a roadway based on data received from a first sensor of the plurality of sensors. The method comprises, in response to receiving the indication, executing in parallel a plurality of procedures configured to detect a plurality of causes for the misdetection of lane markings, respectively, based on the stored data; identifying one of the causes as a root cause for the misdetection of lane markings; and providing a response for mitigating the misdetection of lane markings on the roadway based on the root cause for the misdetection of lane markings. The response includes following a second vehicle ahead of the vehicle, informing an occupant of the vehicle to take over control of driving the vehicle, switching to a second sensor of the plurality of sensors for lane marking detection, and/or scheduling service.

In other features, the method further comprises detecting, using the procedures, whether the misdetection of lane markings is caused by any of: the first sensor being faulty; absence of lane markings on the roadway; presence of rain or snow obscuring lane markings on the roadway; presence of glare or shade obscuring lane markings on the roadway; presence of an obstacle in a field of view of the first sensor; presence of construction on the roadway; a change in lane configuration of the roadway; and the roadway being unpaved.

In other features, the method further comprises processing an image captured by the first sensor, performing clustering and filtering of pixels in the image, performing first and second curve fittings on the filtered pixels, and determining whether a lane marking exists on the roadway based on the second curve fitting.

In other features, the method further comprises processing images captured by two sensors of the plurality of sensors; determining, for each of the two sensors, number of images with and without lane markings; calculating, for each of the two sensors, a ratio of the number of images with or without lane markings to a total number of processed images; and determining whether a lane marking exists on the roadway based on the ratios for the two sensors.

In other features, the method further comprises confirming whether the first sensor is faulty by: comparing a raw image of the roadway captured by the first sensor to a raw image of the roadway captured by a second sensor of the plurality of sensors; or comparing an objected detected in an image of the roadway captured by the first sensor to an object detected in an image of the roadway captured by a second sensor of the plurality of sensors.

Further areas of applicability of the present disclosure will become apparent from the detailed description, the claims, and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

In the drawings, reference numbers may be reused to identify similar and/or identical elements.

DETAILED DESCRIPTION

Figure 3:
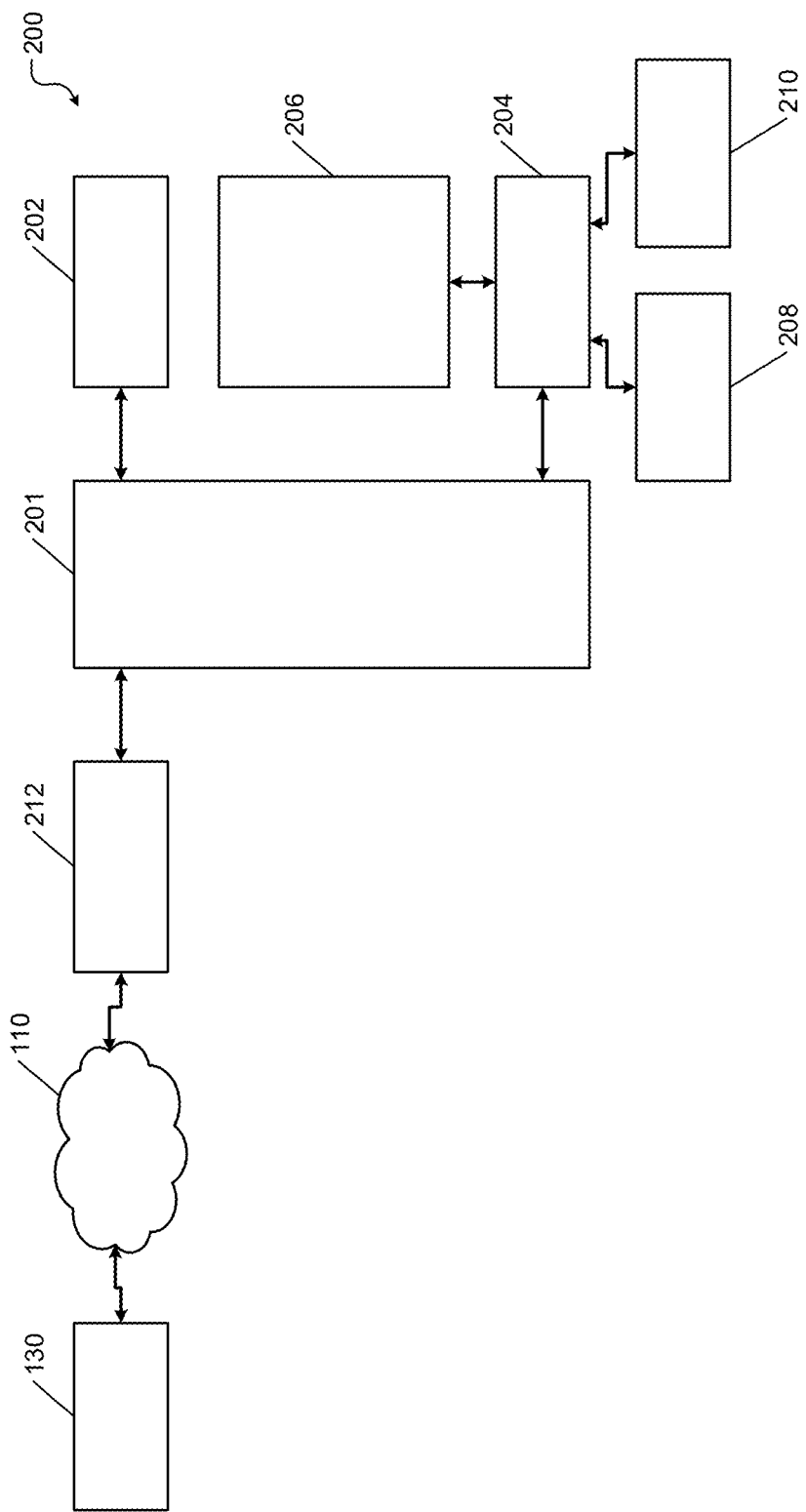
FIG. 3 shows an example of a system for fault isolation and mitigation that can be implemented in a vehicle, a server, or a combination thereof shown in FIG. 1.

Many conventional and autonomous vehicles comprise automated driving systems (see example shown in FIG. 3). For example, the automated driving systems comprise lane departure warning systems and perception systems that perceive surroundings of vehicles using various sensors onboard the vehicles including but not limited to cameras, radar, and Lidar. The lane departure warning systems and perception systems that rely on cameras can fail in scenarios that obscure the field of view of the cameras, that obscure lane markings, or that make lane markings undetectable. Non-limiting examples of such scenarios include heavy rain or snow, construction on roadways, obstacles in the field of view of the sensors, presence of glare/shade, sensor failures, unpaved roads, and so on. In such scenarios, the existence or absence of lane markings cannot be confirmed; and if lane markings exist, the root cause of the inability to detect lane markings cannot be readily determined. Detecting lane markings is helpful in driving conventional and autonomous vehicles. Misdetection of lane markings can be mistakenly inferred as nonexistence of lanes on roadways and can force drivers to take control of the automated driving systems, which can be a nuisance.

The present disclosure solves the above problems by providing a system for isolating fault associated with lane marking detection and providing mitigation strategies upon misdetection of lane markings. As used herein, lane marking misdetection or misdetection of lane markings includes a failure to detect existence of lane markings. For example, the failure may occur due to one or more reasons including but not limited to failure of a sensor such as a camera of a perception system used to sense lane markings; environmental factors such as rain, snow, glare, and shade; obstacles for the sensor; construction on the roadway; changes in lane configurations; and so on. The failure may also occur because the roadway being unpaved or without lane markings, where absence of lane markings is normal but is mis-detected as a failure. The system isolates the root cause of faults by considering sensor failures, ground truth of lane existence, scenarios that affect lane marking detection, and scenarios that affect detecting existence of lanes. The system provides mitigation strategies based on fault isolation results.

The system detects (pseudo) ground truth of lane existence using additional sensors (e.g., Lidar, side cameras, etc.) along with machine learning models trained to detect existence of lane markings. The system can also use a cluster-based method with machine learning models (e.g., neural networks) trained to detect existence of lane markings. The system uses machine learning methods and other rules-based methods to determine the root cause for misdetection of lane markings. These methods can detect scenarios or events such as rain, snow, glare/shade, obstacles, construction zones, exit/entrance/split of a lane, and unpaved roads as root causes for misdetection of lane markings. The system executes tiered mitigation strategies for driving assistance and improving performance of perception systems in such scenarios.

The system for fault isolation and mitigation according to the present disclosure can be located in the vehicle, in one or more servers in a cloud, or in a combination thereof. The system improves the technical field of automated driving systems by providing on-line analysis of lane marking misdetection and fault isolation, by enabling real-time mitigation/adaptation of lane marking detection systems and of automated driving systems upon fault isolation, and by minimizing engineering efforts in trouble-shooting malfunctions in lane marking detection systems. These and other features of the system of the present disclosure are described below in detail.

The present disclosure is organized as follows. Initially, a distributed computing system that can partly or fully implement the system and methods for fault isolation and mitigation according to the present disclosure is shown and described with reference to FIGS. 1 and 2. A system that can partly or fully implement the methods for fault isolation and mitigation according to the present disclosure is shown and described with reference to FIG. 3. Various methods for fault isolation and mitigation according to the present disclosure, which can be implemented in the distributed computing system of FIGS. 1 and 2, the system of FIG. 3, or in a combination thereof, are shown and described with reference to FIGS. 4-18.

Figure 1:
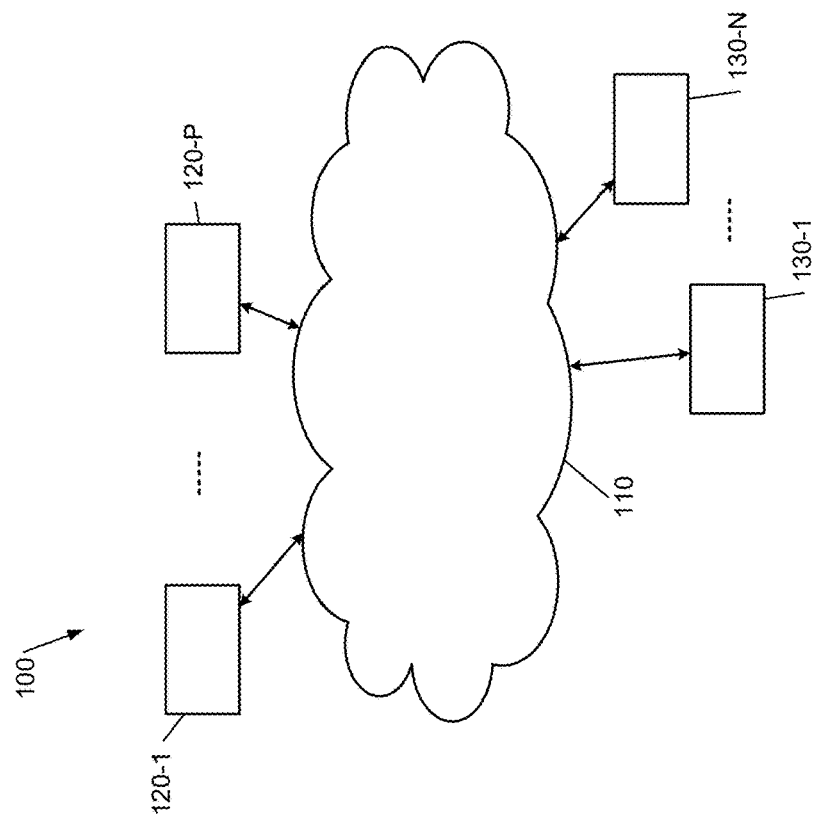
FIG. 1 shows a simplified example of a distributed computing system that can implement the systems and methods shown in FIGS. 3-18.

FIG. 1 shows a simplified example of a distributed computing system 100. The distributed computing system 100 can partly or fully implement the system and methods for fault isolation and mitigation according to the present disclosure, which are shown and described below with reference to FIGS. 3-18. The distributed computing system 100 includes a distributed communications system 110, one or more vehicles 120-1, 120-2, . . . , and 120-M (collectively, vehicles 120), and one or more servers 130-1, 130-2, . . . , and 130-N (collectively, servers 130). M and N are integers greater than or equal to one.

The distributed communications system 110 may include a local area network (LAN), a wide area network (WAN) such as the Internet, and/or other type of network. The vehicles 120 and the servers 130 may be located at different geographical locations and may communicate with each other via the distributed communications system 110. For example, the servers 130 may be located in a data center in a cloud. The vehicles 120 and the servers 130 may connect to the distributed communications system 110 using wireless and/or wired connections.

The vehicles 120 may include a system shown and described below with reference to FIG. 3 that may execute software applications. The software applications can implement the various methods for fault isolation and mitigation according to the present disclosure, which are shown and described below with reference to FIGS. 4-18. The servers 130 may provide multiple services to the vehicles 120. For example, the servers 130 may execute software applications. The software applications can implement the various methods for fault isolation and mitigation according to the present disclosure, which are shown and described below with reference to FIGS. 4-18. The servers 130 may host multiple databases that are relied on by the software applications to provide the services to occupants of the vehicles 120.

Figure 2:
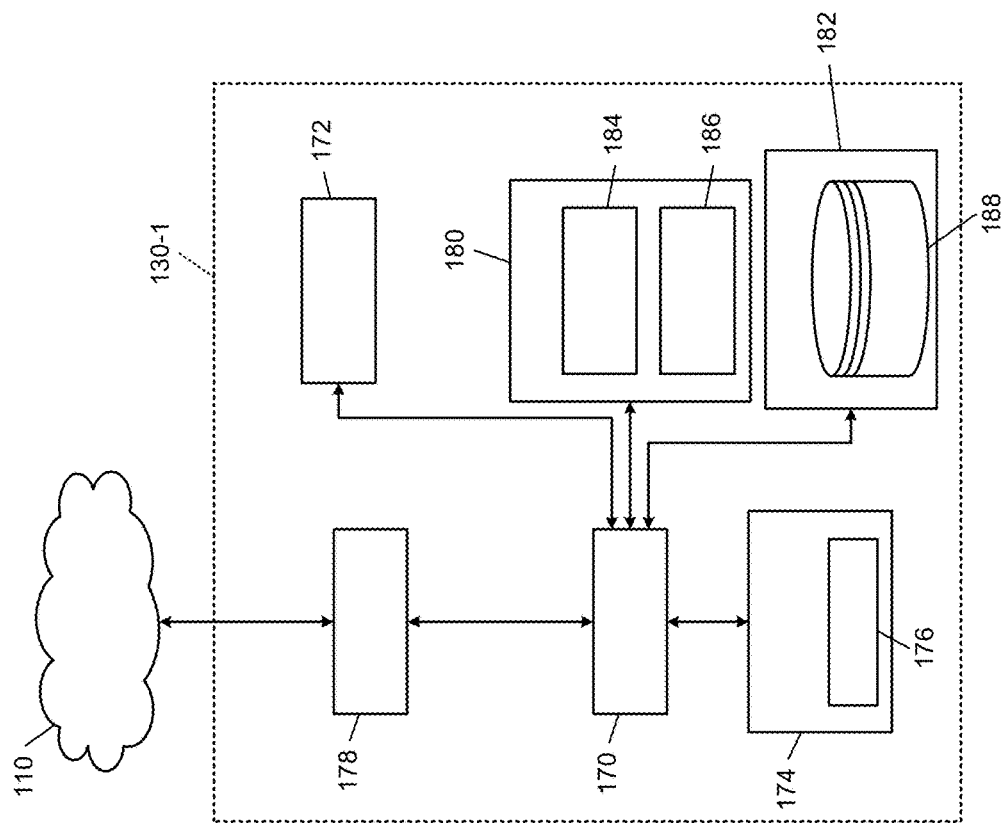
FIG. 2 shows a simplified example of a server of the distributed computing system of FIG. 1.

FIG. 2 shows a simplified example of the server 130-1. The server 130-1 may include one or more CPUs or processors 170, a network interface 178, memory 180, and bulk storage 182. In some implementations, the server 130-1 may be a general-purpose server and may include one or more input devices 172 (e.g., a keypad, touchpad, mouse, and so on) and a display subsystem 174 including a display 176. The network interface 178 connects the server 130-1 to the distributed communications system 110. For example, the network interface 178 may include a wired interface (e.g., an Ethernet interface) and/or a wireless interface (e.g., a Wi-Fi, Bluetooth, near field communication (NFC), or another wireless interface). The memory 180 may include volatile or nonvolatile memory, cache, or other type of memory. The bulk storage 182 may include flash memory, one or more magnetic hard disk drives (HDDs), or other bulk storage devices.

The processor 170 of the server 130-1 executes an operating system (OS) 184 and one or more software applications 186. The software applications 186 can implement the various methods for fault isolation and mitigation according to the present disclosure, which are shown and described below with reference to FIGS. 4-18. In some examples, the software applications 186 may be implemented in a virtual machine hypervisor or containerized architecture. The bulk storage 182 may store one or more databases 188 that store data structures used by the software applications 186 to perform respective functions.

FIG. 3 shows an example of a system 200 for fault isolation and mitigation implemented in a vehicle (e.g., any of the vehicle 140 shown in FIG. 1) according to the present disclosure. The system 200 comprises a controller 201, an infotainment subsystem 202, an automated driving subsystem 204, and a communication subsystem 212. The communication subsystem 212 may communicate with the one or more servers 130 via the distributed communications system 110. The controller 201 implements the various methods for fault isolation and mitigation according to the present disclosure, which are shown and described below with reference to FIGS. 4-18. Instead, in some examples, the one or more servers 130 may execute these methods, and the controller 201 may send the requisite data to the one or more servers 130 and may receive results of the processed data from the one or more servers 130. In other examples, the controller 201 may execute some of these methods while the one or more servers 130 may execute the remaining methods. Further, the controller 201 and one of the servers 130 may execute portions of any of these methods. In any of these examples, the infotainment subsystem 202 provides the results of these methods to the occupants of the vehicle. For example, the infotainment subsystem 202 provides the alerts and other messages regarding fault isolation and mitigation to the occupants of the vehicle.

The infotainment subsystem 202 comprises audiovisual interfaces that allow the occupants of the vehicle to interact with various subsystems of the vehicle. For example, the results provided by these methods can be output via the infotainment subsystem 202 in the form of a visual message displayed on a display of the infotainment subsystem 202, in the form of an audio message output via a speaker of the infotainment subsystem 202, or a combination thereof. For example, the infotainment subsystem 202 can comprise a touch screen using which an occupant of the vehicle can select a command from a drop-down menu displayed on a graphical user interface (GUI) on the touch screen. For example, the infotainment subsystem 202 can comprise a microphone through which an occupant of the vehicle can issue a command to a subsystem of the vehicle, and so on. For example, these commands can be in response to a result (e.g., an alert or other message) provided by these methods (e.g., to gain control of the automated driving subsystem 204).

The automated driving subsystem 204 performs driving operations using a plurality of navigation sensors 206. For example, the navigation sensors 206 can comprise cameras installed throughout the vehicle, a global positioning system (GPS), an inertial measurement unit (IMU), a radar system (short and long range), a Lidar system, and so on. Using data from these sensors, the automated driving subsystem 204 can perform driving operations. For example, the automated driving subsystem 204 can control a steering subsystem 208 and a braking subsystem 210 of the vehicle. Depending on the results provided by one or more methods described below, the automated driving subsystem 204 can drive the vehicle or allow an occupant of the vehicle to take control of the vehicle.

Figure 4:
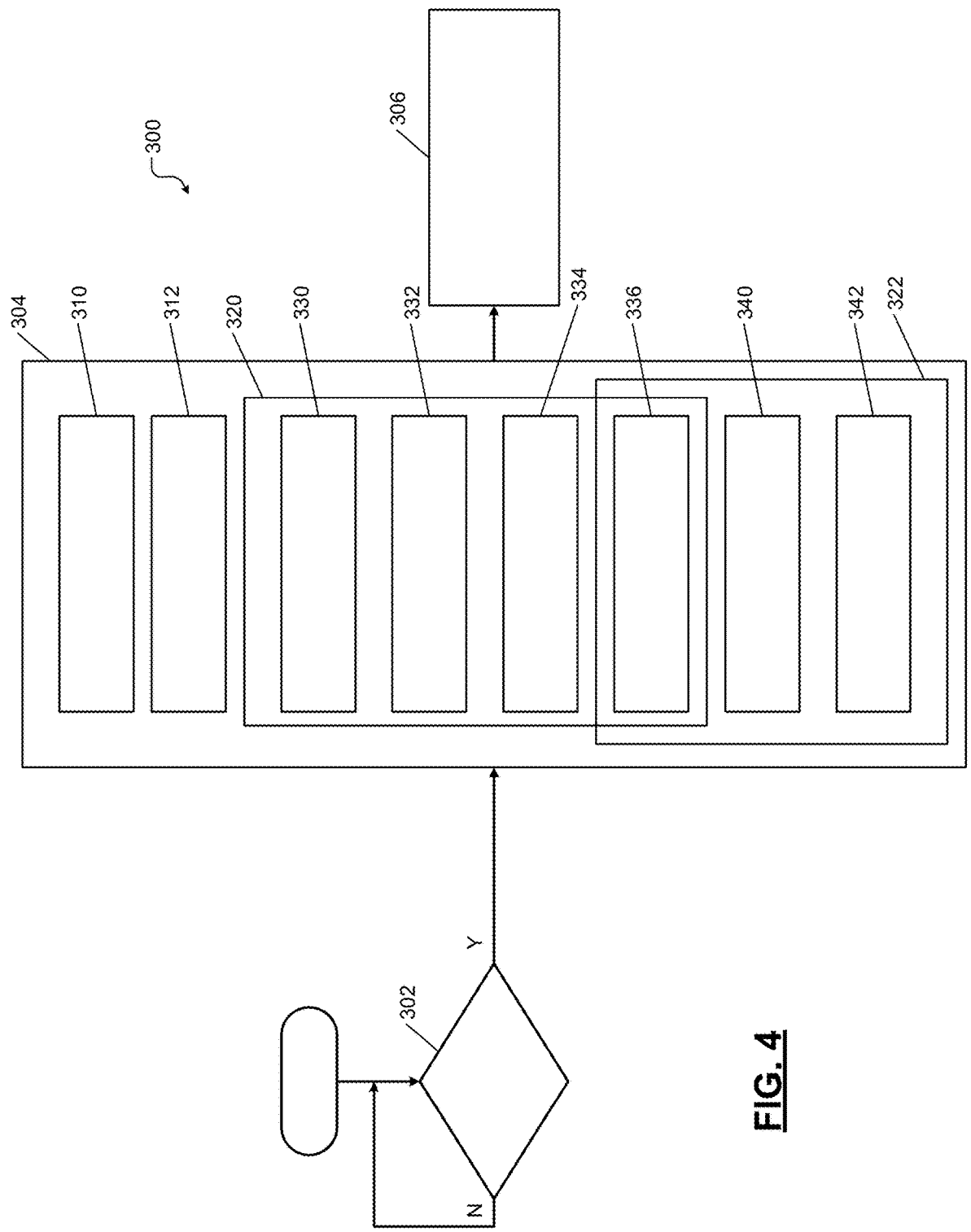
FIG. 4 shows examples of scenarios or events that can be detected by the system of FIG. 3 and of outputs that can be generated based on the detections for fault isolation and mitigation.

FIG. 4 shows different scenarios or events that can be detected by the system 200 (e.g., the controller 201) and different outputs that can be generated based on the detections. As shown generally at 300, the controller 201 can execute in parallel various methods described below with reference to FIGS. 5-18 to perform these detections and provide mitigation strategies upon making these detections. The detection of these scenarios is triggered by a lane marking misdetection event shown at 302. For example, a lane marking misdetection event occurs when a sensor in a perception system, such as a camera in the navigation sensors 206, mis-detects a lane marking of a lane being tracked by the sensor when the vehicle is being driven on a roadway. The scenario detection is generally shown at 304, which includes checking sensor failure shown at 310 and checking ground truth for lane marking existence shown at 312 (both are described below in detail). Additional scenarios are described below. The outputs generated by the controller 201 based on the scenario detection performed at 304 are shown generally at 306 and in detail in Table 1 shown below.

At 304, upon being triggered by a lane marking misdetection event shown at 302, the controller 201 runs in parallel the methods shown in FIGS. 5-18 and detects any of the following scenarios that can potentially cause or trigger the lane marking misdetection event to determine a root cause for the trigger. For example, the scenarios can be of two types: a first type of scenarios shown generally at 320 and a second type of scenarios shown at generally 322.

For example, the first type of scenarios 320 may include rain (and/or snow) detection 330, glare and/or shade detection 332, obstacle detection 334, and construction zone detection 336. For example, the second type of scenarios 322 may include detection 340 of exit, entrance, and/or split of a lane (collectively shown as exit/entrance/split detection 340), unpaved road detection 342, and also construction zone detection 336. These detections along with checking sensor failure shown at 310 and checking ground truth for lane marking existence shown at 312 are described below in further detail with reference to subsequent figures.

Based on the detections shown at 304, the controller 201 generates one or more outputs $X_1$, $X_2$, $X_3$, and $X_4$ and provides mitigation strategies, which are shown below in Table 1. The controller 201 sets the output $X_1$ to Y if a sensor failure (e.g., a fault in the camera) is detected and to N if a sensor failure is not detected. The controller 201 sets the output $X_2$ to Y if a lane exists (i.e., existence of a lane marking is confirmed) and to N if a lane does not exist (e.g., if the road is unpaved). The controller 201 sets the output $X_3$ to Y if any of the first type of scenarios 320 is detected and to N if any of the first type of scenarios 320 is not detected. The controller 201 sets the output $X_4$ to Y if any of the second type of scenarios 322 is detected and to N if any of the second type of scenarios 322 is not detected.

TABLE 1

| $X_1$ | $X_2$ | $X_3$ | $X_4$ | Output | Execute one or more actions for mitigation |
|---|---|---|---|---|---|
| Y | Y | Y | Y | Sensor Fault | If lane detection is camera based, the controller 201 switches to Lidar based lane detection. Alternatively, the controller 201 switches to detection methods using other cameras with overlapping field of view. |
| Y | Y | Y | N | Sensor Fault | |
| Y | Y | N | Y | Sensor Fault | |
| Y | Y | N | N | Sensor Fault | Controller 201 issues a service required notification. Controller 201 saves records for service purposes (e.g., to assist in determining root cause of lane marking misdetection event). |
| Y | N | Y | Y | No Lane + Sensor Fault | Controller 201 attempts navigation by following other vehicles, road edge, etc., using other sensors. |
| Y | N | Y | N | No Lane + Sensor Fault | |
| Y | N | N | Y | No Lane + Sensor Fault | Controller 201 issues a service required notification. |
| Y | N | N | N | No Lane + Sensor Fault | Controller 201 saves records for service purposes (e.g., to assist in determining root cause of lane marking misdetection event). |
| N | Y | Y | Y | Lane misdetection due to Scenario Type 1 | Controller 201 attempts navigation by following other vehicles, road edge, etc., detected using rain enhancement algorithm with ISP/filter. |

TABLE 1-continued

| $X_1$ | $X_2$ | $X_3$ | $X_4$ | Output | Execute one or more actions for mitigation |
|---|---|---|---|---|---|
| N | Y | Y | N | Lane misdetection due to Scenario Type 1 | Controller 201 switches to lane detection methods specific for the scenario (e.g., methods for heavy rain or simple vehicle following). |
| N | Y | N | Y | Lane misdetection with unknown reason | Controller 201 attempts navigation by following other vehicles, road edge, etc. Controller 201 saves data for refining detection methods (e.g., re-train perception method). |
| N | Y | N | N | Lane misdetection with unknown reason | Controller 201 attempts navigation by following other vehicles, road edge, etc. Controller 201 saves data for refining detection methods (e.g., re-train perception method). |
| N | N | Y | Y | No Lane due to Scenario Type 2 | Controller 201 attempts navigation by following other vehicles, road edge, etc., detected using rain enhancement algorithm with ISP/filter. |
| N | N | Y | N | No Lane with unknown reason | Controller 201 attempts navigation by following other vehicles, road edge, etc., detected using rain enhancement algorithm with ISP/filter. Controller 201 saves data for refining detection methods (e.g., improve diagnostics methods). |
| N | N | N | Y | No Lane due to Scenario Type 2 | Controller 201 attempts navigation by following other vehicles, road edge, etc. |
| N | N | N | N | No Lane with unknown reason | Controller 201 attempts navigation by following other vehicles, road edge, etc. Controller 201 saves data for refining detection methods (e.g., improve diagnostics methods). |

FIGS. 5-18 shows various method for the detections and mitigations described above and in Table 1. One or more of these methods can be performed by the controller 201, the one or more servers 130, or using a combination thereof. The controller 201 performs these methods in parallel and uses the results output by these methods according to the table shown above to provide mitigation strategies.

Figure 5:
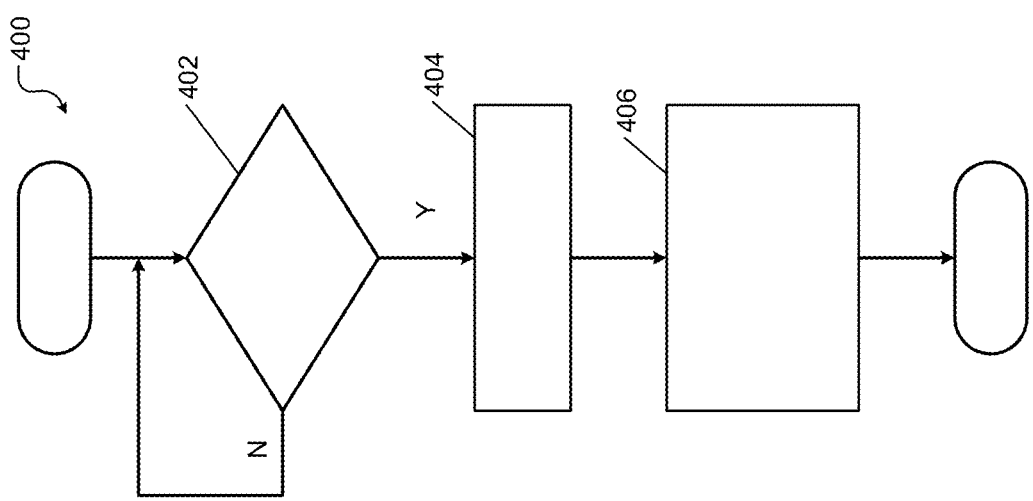
FIG. 5 shows a general method performed by the system of FIG. 3 upon misdetection of lane markings.

FIG. 5 shows a general method 400 performed upon mis-detecting lane markings. The detailed steps of the method 400 are described below with reference to subsequent figures. At 402, the method 400 determines whether lane marking is mis-detected. If lane marking is mis-detected, at 404, the method 400 performs fault isolation procedures in parallel and generates one or more outputs $X_1$, $X_2$, $X_3$, and $X_4$ as shown in FIG. 4 and Table 1. Various methods for performing fault isolation and determining a root cause for the fault (i.e., lane marking misdetection) are described below in detail. At 406, upon isolating the fault, the method 400 executes one or more mitigation strategies based on the outputs of the fault isolation methods (e.g., see Table 1).

Figure 6:
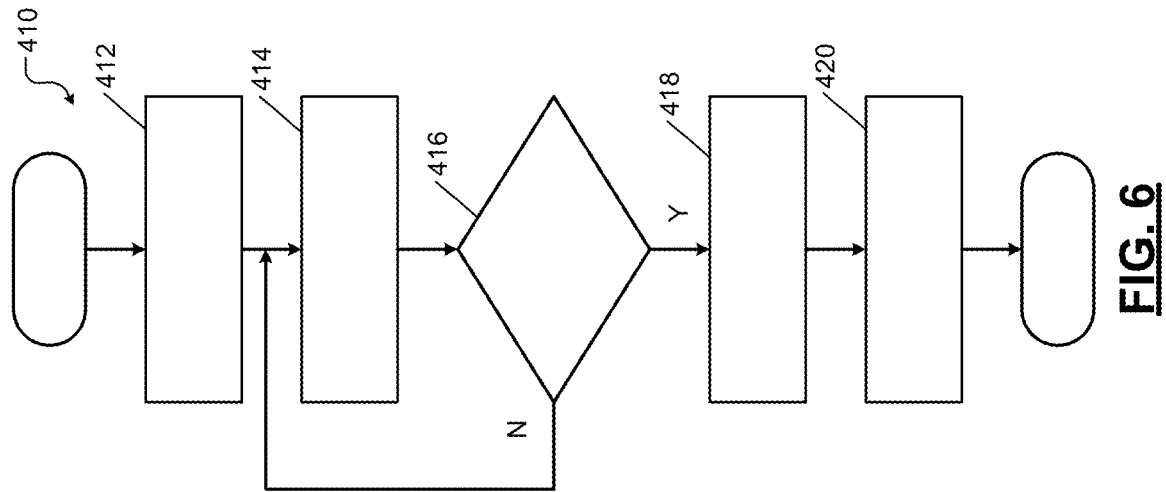
FIG. 6 shows a method for performing lane marking misdetection analysis.

FIG. 6 shows a method 410 for performing lane marking misdetection analysis. At 412, the method 410 initializes a cyclic buffer (e.g., in the controller 201 or in the automated driving subsystem 204) of a predetermined size B, which is calibratable. For example, the size B of the buffer can be selected such that the cyclic buffer can store sufficient amount of data from one or more sensors (e.g., the navigation sensors 206 shown in FIG. 3) onboard the vehicle before and after lane marking misdetection occurs. At 414, the method 410 stores relevant data from the one or more sensors onboard the vehicle in the cyclic buffer. For example, the data stored in the cyclic buffer may include but is not limited to the following: data from the IMU, images captured by a front camera, images captured by one or more side cameras, data from short range and long range radar, data from Lidar, results of data processed by a perception system, which can comprise one or more of the cameras, vehicle trajectory after lane marking misdetection if driver takes over, and so on.

At 416, the method 410 determines if lane markings are mis-detected (e.g., by a perception system in the vehicle). The method 410 returns to 414 if lane markings are correctly detected (i.e., lane marking misdetection does not occur). If lane markings are mis-detected, at 418, the method 410 stores additional data in the cyclic buffer for a predetermined time period T following the lane marking misdetection, where T is also calibratable. At 420, the method 410 performs fault isolation and executes one or more mitigation strategies, examples of which are shown in Table 1. Various methods for performing fault isolation and determining a root cause for the fault are described below in detail.

Figure 7:
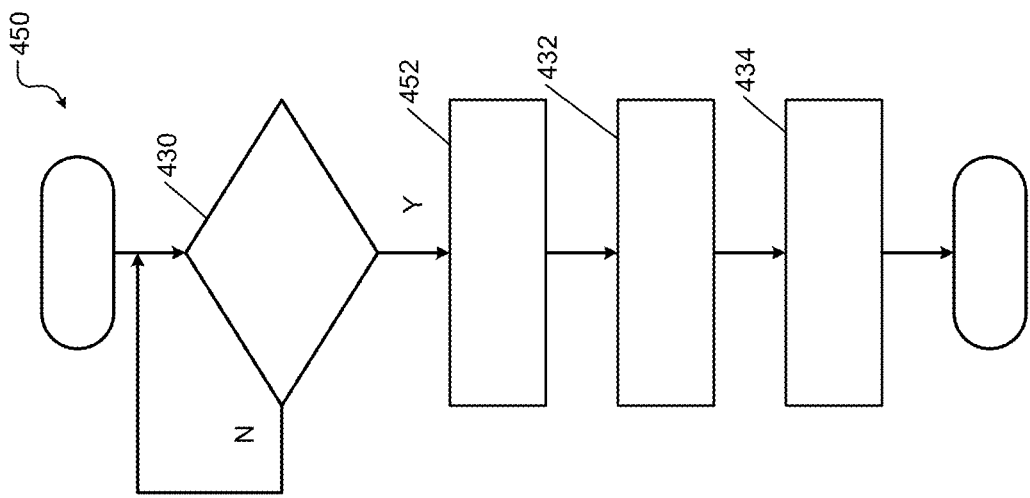
FIG. 7 shows a general method for determining one or more causes of lane marking misdetection and providing mitigation strategies.

FIG. 7 shows a general method 450 for determining causes of lane marking misdetection and performing mitigation strategies upon detecting the failure. The detailed steps of the method 450 are described below with reference to FIGS. 8-18. At 430, the method 450 determines if lane markings are mis-detected. The method 450 returns to 432 if lane markings are not mis-detected (i.e., if lane markings are correctly detected). If lane markings are mis-detected, at 452, the method 450 determines existence of lane markings. Two methods 452-1 and 452-2 to determine ground truth about the existence of lane markings are shown and described below with reference to FIGS. 8A and 8B and FIG. 9.

At 432, the method 450 determines one or more causes for lane marking misdetection. These methods are described below with reference to FIG. 10 onwards. At 434, upon determining one or more causes for lane marking misdetection, the method 450 executes one or more mitigation strategies, examples of which are shown in Table 1 and are described below in further detail.

Figure 8B:
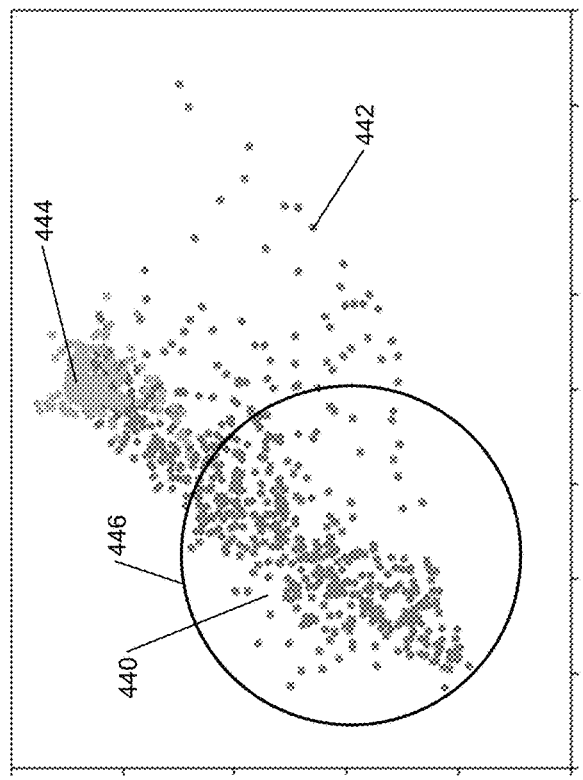
FIGS. 8A-8B show a first method for detecting existence of lane markings.
Figure 8A:
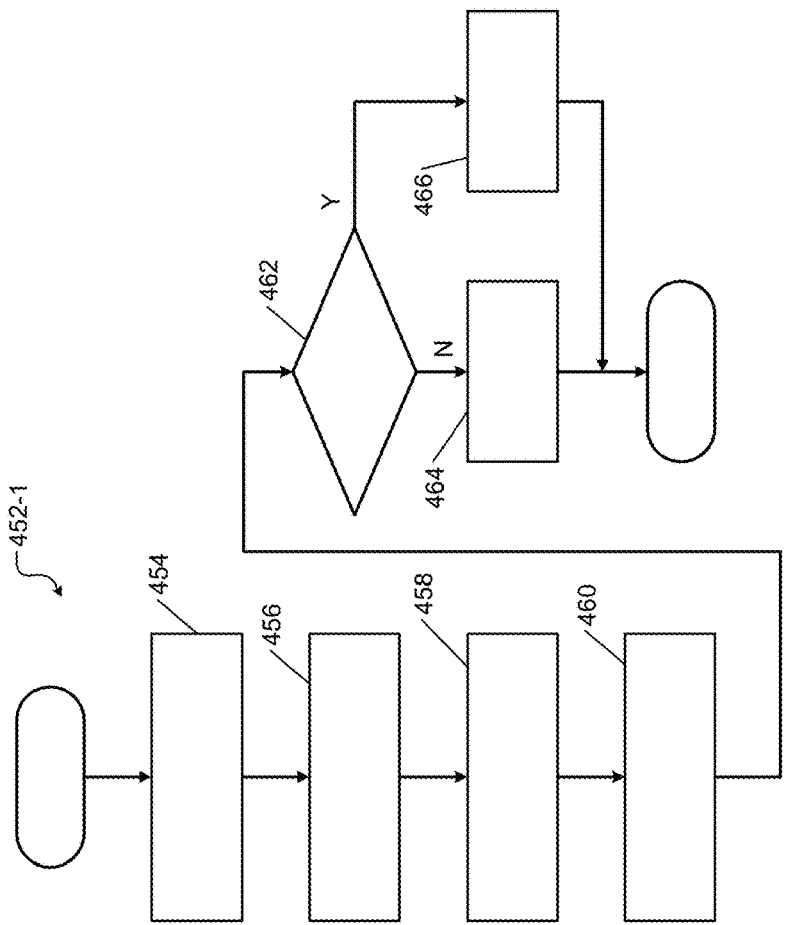
Figure 9:
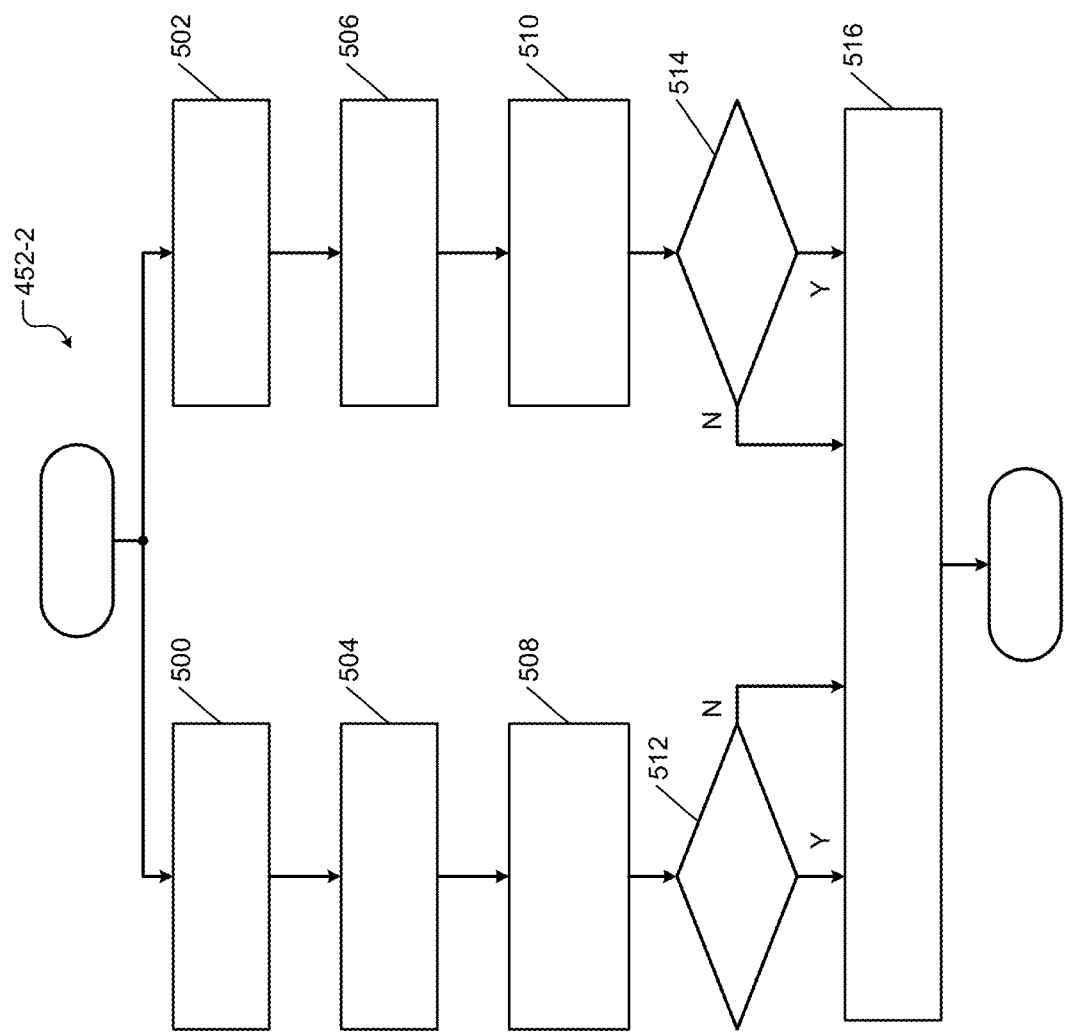
FIG. 9 shows a second method for detecting existence of lane markings.

FIGS. 8A-8B and 9 respectively show two different methods 452-1 and 452-2 to detect ground truth about the existence of lane markings. FIGS. 8A and 8B show a first method 452-1 to detect ground truth about the existence of lane markings. FIG. 9 shows a second method 452-2 to detect ground truth about the existence of lane markings. These methods correspond to checking ground truth for lane marking existence shown at 312 in FIG. 4. Any one of these methods may be used. These methods provide respective results to the controller 201. The controller 201 uses the results to isolate fault (i.e., to diagnose a root cause of lane marking misdetection) and provide mitigation strategies according to Table 1.

In FIG. 8A, at 454, the method 452-1 captures an image of a portion of a roadway on which the vehicle is traveling using a front camera (e.g., one of the navigation sensors 206 shown in FIG. 3). At 456, the method 452-1 performs clustering and space filtering of pixels in the captured image. An example of clustering and space filtering is shown in FIG. 8B.

In FIG. 8B, for example, the captured image may include pixels 440 that may relate to a lane marking. The captured image may also include pixels 442 that are outliers. Further, the captured image may also include pixels 444 that relate to an object unrelated to the lane marking. For example, the pixels 444 may relate to a portion of hood of the vehicle or any other portion of the vehicle that obstructs the field of view of the camera that captures the image. The method 452-1 determines mean and standard distribution of the cluster of pixels in the captured image. The method 452-1 uses a space filter (e.g., a sphere) 446 to filter the pixels 442 that are outliers and the pixels 444 that are unrelated to the lane marking. The method 452-1 selects the pixels 440 that correspond to the same cluster of pixels.

At 458, the method 452-1 performs a first iteration of curve fitting on the selected pixels 440. The first iteration of curve fitting removes pixels that are relatively far from a center of the fitted curve. Thus, the first iteration of curve fitting is a form of additional filtering performed on the selected pixels 440.

At 460, the method 452-1 performs a second iteration of curve fitting on the pixels that remain after the first iteration of curve fitting to obtain filtered lane pixels. At 462, the method 452-1 determines if the number and/or density of pixels in the filtered lane pixels obtained after the second curve fitting is sufficient (e.g., greater than a threshold) to conclude that a lane marking exists. If the number and/or density of pixels in the filtered lane pixels obtained after the second curve fitting is sufficient, at 464, the method 452-1 concludes that a lane marking exists. If the number and/or density of pixels in the filtered lane pixels obtained after the second curve fitting is not sufficient, at 466, the method 452-1 concludes that a lane marking does not exist.

FIG. 9 shows an alternate 452-2 method to determine if a lane marking exists or not. The method 452-2 processes in parallel images captured by two cameras (e.g., left, and right cameras) onboard the vehicle. At 500, the method 452-2 loads a first model trained to detect lane markings using machine learning (e.g., a CNN model, where CNN is convolutional neural network) to process images from a first camera (e.g., left camera). At 502, the method 452-2 loads a second model trained to detect lane markings using machine learning (e.g., a CNN model) to process images from a second camera (e.g., right camera).

At 504, from the images received from the first camera, using the first model, the method 452-2 determines a number of images with and without lane markings. For example, the method 452-2 may make this determination by selecting images stored in the cyclic buffer before and after lane marking misdetection as explained above with reference to FIG. 6.

At 506, from the images received from the second camera, using the second model, the method 452-2 determines a number of images with and without lane markings. For example, the method 452-2 may make this determination by selecting images stored in the cyclic buffer before and after lane marking misdetection as explained above with reference to FIG. 6.

At 508, for the images processed from the left camera, the method 452-2 calculates a ratio of the number of images without lane markings to a total number of images. Alternately, the method 452-2 can calculate a ratio of the number of images with lane markings to a total number of images.

At 510, for the images processed from the right camera, the method 452-2 calculates a ratio of the number of images without lane markings to a total number of images. Alternately, the method 452-2 can calculate a ratio of the number of images with lane markings to a total number of images.

At 512, the method 452-2 determines if the ratio calculated for the left camera is greater than or equal to a threshold. Alternately, if the method 452-2 calculates a ratio of the number of images with lane markings to a total number of images, the method 452-2 determines if the ratio calculated for the left camera is less than or equal to a threshold.

At 514, the method 452-2 determines if the ratio calculated for the right camera is greater than or equal to a threshold. Alternately, if the method 452-2 calculates a ratio of the number of images with lane markings to a total number of images, the method 452-2 determines if the ratio calculated for the right camera is less than or equal to a threshold. The thresholds are calibratable.

At 516, the method 452-2 determines if the ratios calculated for the left and right cameras are not greater than or equal to the threshold (i.e., if the decisions at 512 and 514 are N and N). If the decisions at 512 and 514 are N and N, the method 452-2 determines that lane markings exist in the processed images. If the decisions at 512 and 514 are Y and Y, Y and N, or N and Y, the method 452-2 determines that lane markings do not exist in the processed images. The method 452-2 can make similar determinations if the ratios are calculated alternately as mentioned above.

Figure 10:
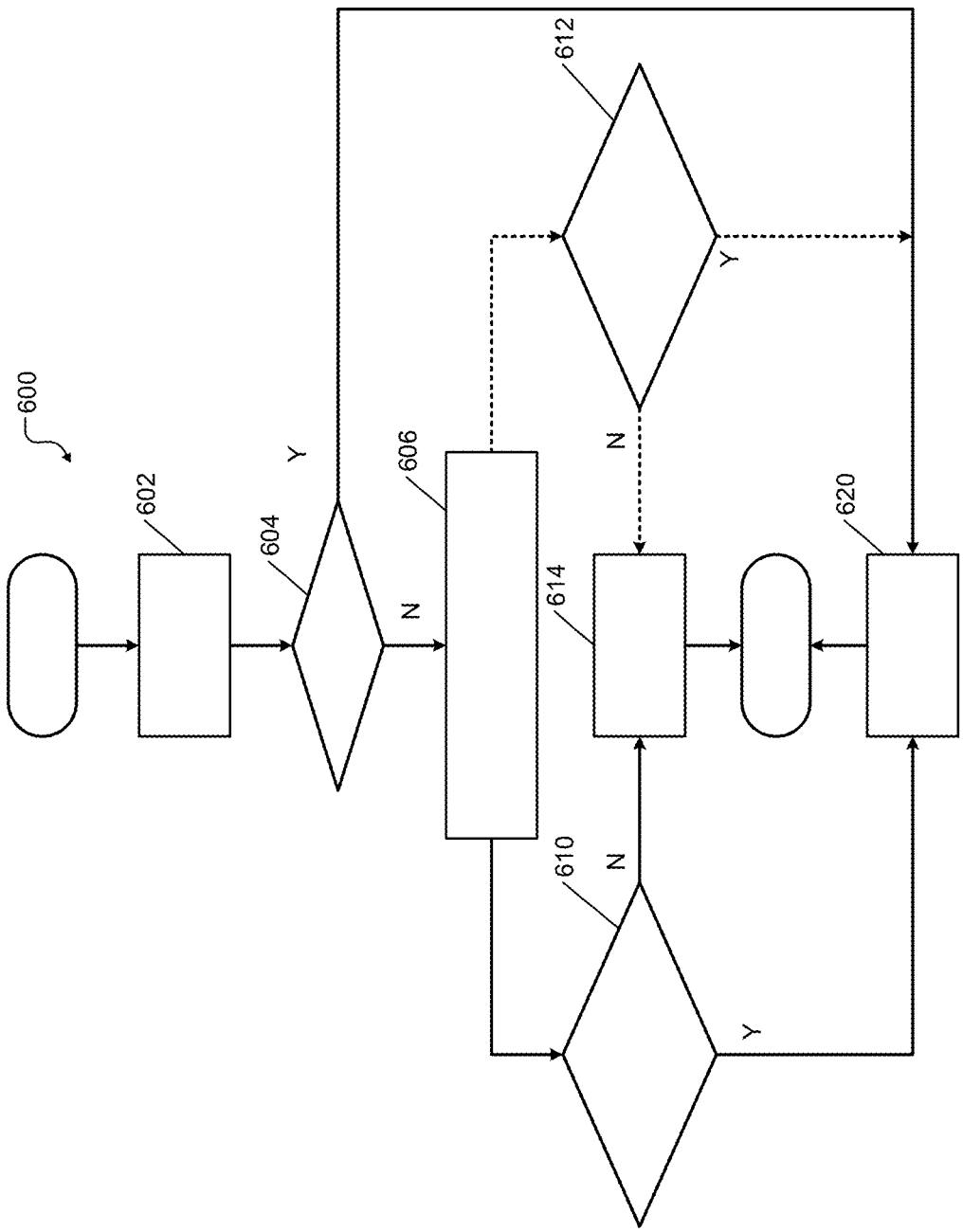
FIG. 10 shows a method for diagnosing a sensor used for detecting lane markings.

FIG. 10 shows a method 600 for diagnosing a sensor (i.e., camera) used for detecting lane markings (i.e., checking sensor failure shown at 310 in FIG. 4). The method 600 provides results to the controller 201. The controller 201 uses the results to isolate fault (i.e., to diagnose a root cause of lane marking misdetection) and provides mitigation strategies according to Table 1.

Typically, a perception system in the vehicle (e.g., implemented in the automated driving subsystem 204 shown in FIG. 3) includes the camera (e.g., one of the navigation sensors 206 shown in FIG. 3). The perception system monitors the operation of the camera. The perception system can generate a diagnostic trouble code (DTC) for the camera using an onboard diagnostics (OBD) system. At 602, the method 600 reads the DTC for the camera. At 604, the method 600 determines if the DTC is set (indicating a fault in the camera). If the DTC is set, at 620, the method 600 determines that the sensor (i.e., the camera) has failed and that the lane marking misdetection is due to the failure of the camera.

If, however, the DTC is not set (i.e., the camera may be operating normally) and still lane marking is mis-detected, at 606, the method 600 cross-validates the results from the camera and from other sensors. For example, the method 600 compares detections made by the camera and another sensor with overlapping field of view (FOV) with the camera. For example, the other sensor may be another camera (e.g., a side camera) or Lidar.

The method 600 can perform two alternate types of processing. A first type of processing involves determining actual objects detected by the two sensors (i.e., the camera and another sensor with overlapping FOV) and comparing the detected objects, which can be computationally intensive. Alternatively, a second type of processing involves comparing raw images captured by the two sensors, which is computationally less intensive than the first type of processing.

At 610, the method 600 performs the first type of processing. The method 600 processes images captured by the two sensors (i.e., the camera and another senor) and detects objects in the images captured by the two sensors. The method 600 compares the objects detected in the images captured by the two sensors and determines if the objects detected in the images captured by the two sensors match. If the object detected in the images captured by the two sensors mismatch, at 620, the method 600 determines that the sensor (i.e., the camera) has failed and that the lane marking misdetection is due to the failure of the camera. If the object detected in the images captured by the two sensors match, at 614, the method 600 determines that the sensor (i.e., the camera) is healthy (i.e., operating normally) and that the lane marking misdetection is not due to the failure of the camera.

Alternatively, at 612, the method 600 performs the second type of processing. The method 600 compares raw images captured by the two sensors and determines if the raw images captured by the two sensors match. If the raw images captured by the two sensors mismatch, at 620, the method 600 determines that the sensor (i.e., the camera) has failed and that the lane marking misdetection is due to the failure of the camera. If the raw images captured by the two sensors match, at 614, the method 600 determines that the sensor (i.e., the camera) is healthy (i.e., operating normally) and that the lane marking misdetection is not due to the failure of the camera.

Figure 11:
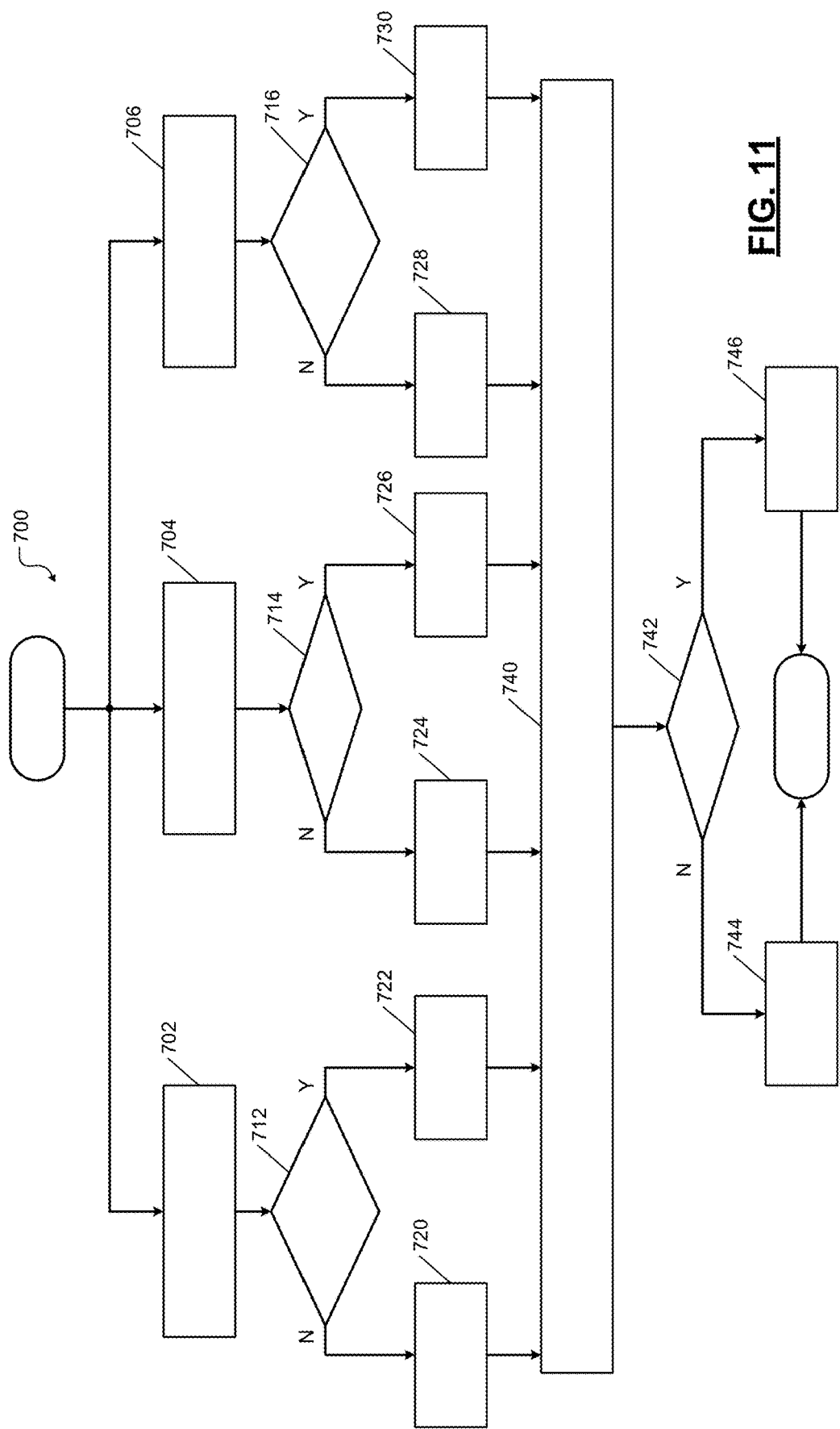
FIG. 11 shows a method for detecting an unpaved road.

FIG. 11 shows a method 700 for detecting an unpaved road (i.e., the unpaved road detection 342 shown in FIG. 4). The method 700 can detect an unpaved road using a combination of various techniques as described below. The method 700 provides results to the controller 201. The controller 201 uses the results to isolate fault (i.e., to diagnose a root cause of lane marking misdetection) and provides mitigation strategies according to Table 1.

At 702, the method 700 classifies images of the roadway captured by a sensor (e.g., a camera in the navigation sensors 206) as being images of a paved or an unpaved road. For example, the method 700 may make such classification by selecting images stored in the cyclic buffer before and after lane marking misdetection as explained above with reference to FIG. 6. For example, to make the classification, the method 700 can use a machine learning model (e.g., a CNN model) trained to detect paved and unpaved roads. Using the trained model, the method 700 can classify the images selected from the cyclic buffer.

At 710, the method 700 calculates a ratio of a number of images indicating that the road is an unpaved road to a total number of images. Alternatively, the method 700 can calculate a ratio of a number of images indicating that the road is a paved road to a total number of images. If the ratio is greater than or equal to a predetermined threshold, which is calibratable, the method 700 determines that the road is an unpaved (or a paved road if the alternate ratio is used). At 720, the method 700 sets a parameter $X_{CNN}=0$ if the road is unpaved. Alternatively, at 722, the method 700 sets the parameter $X_{CNN}=1$ if the road is a paved road.

Additionally, at 704, the method 700 looks up (i.e., reads) map information for the road being traveled by the vehicle. For example, the controller 201 (shown in FIG. 3) obtains the map information from one of the servers 130. The controller 201 uses GPS data provided by the GPS (see the navigation sensors 206 in FIG. 3) and the map information to detect the road being traveled by the vehicle. For example, the method 700 can select the GPS data from the data stored in the cyclic buffer as explained above with reference to FIG. 6. At 712, the method 700 determines based on the detected road and the map information whether the road is a paved road or an unpaved road. At 724, the method 700 sets a parameter $X_{MAP}=0$ if the road is unpaved. Alternatively, at 726, the method 700 sets the parameter $X_{MAP}=1$ if the road is a paved road.

Furthermore, at 706, the method 700 calculates a power spectrum of road vibrations sensed by the IMU data of the vehicle (e.g., see the navigation sensors 206 in FIG. 3). Again, the method 700 can select the IMU data from the data stored in the cyclic buffer as explained above with reference to FIG. 6. At 714, the method 700 compares the power spectrum (e.g., energy of frequencies in the power spectrum) to a predetermined threshold $E_{th}$ (calibratable) to determine whether the road being traveled by the vehicle is a paved road or an unpaved road. For example, the method 700 concludes that the road is an unpaved road if the power spectrum (e.g., energy of frequencies in the power spectrum) is greater than or equal to the predetermined threshold $E_{th}$. At 728, the method 700 sets a parameter $X_{IMU}=0$ if the road is unpaved. Alternatively, at 730, the method 700 sets the parameter $X_{IMU}=1$ if the road is a paved road.

At 740, the method 700 calculates a weighted metric $M=W_1X_{CNN}+W_2X_{MAP}$ $W_3X_{IMU}$, where the weights $W_1$, $W_2$, and $W_3$ are calibratable. At 742, the method 700 compares the weighted metric M to a predetermined threshold $M_{th}$, which is also calibratable. At 744, the method 700 confirms that the road is an unpaved road if the weighted metric M is less than the predetermined threshold $M_{th}$. Alternatively, at 746, the method 700 confirms that the road is not an unpaved road if the weighted metric M is greater than or equal to the predetermined threshold $M_{th}$. Thus, by using a combination of three different techniques (shown at 702, 704, and 706), the method 700 robustly determines if the road on which the vehicle is traveling is a paved road or an unpaved road.

Figure 12:
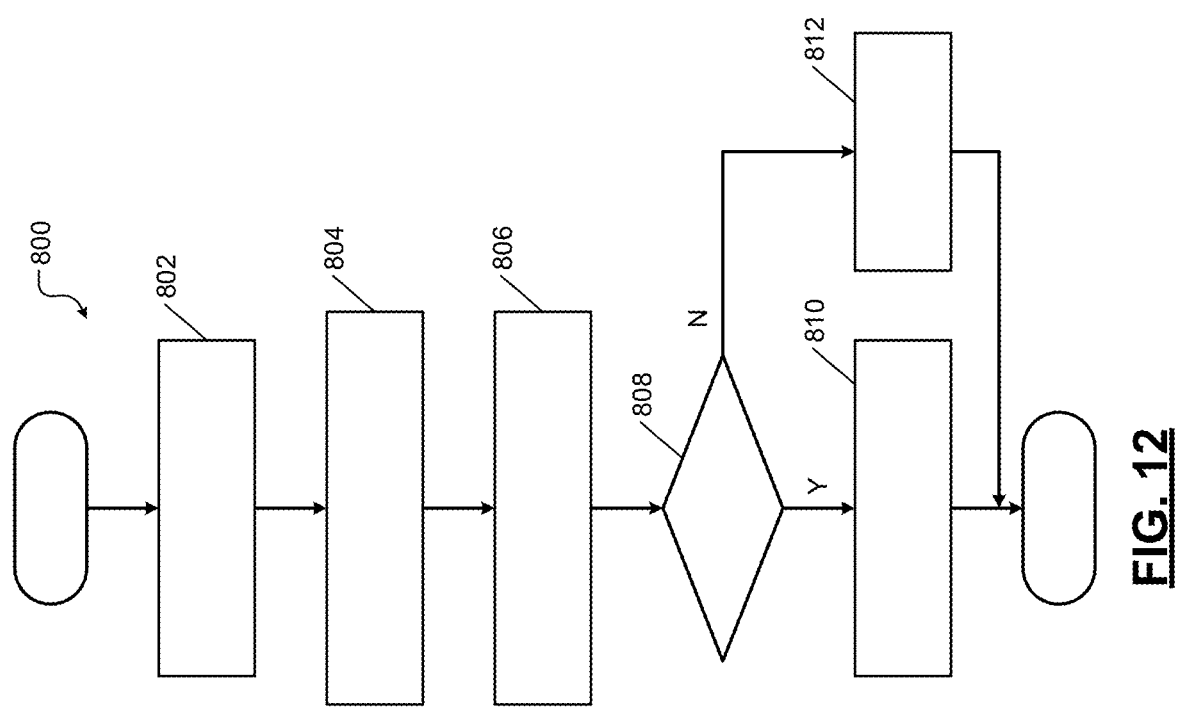
FIG. 12 shows a method for detecting rain and/or snow that can cause misdetection of lane markings.

FIG. 12 shows a method 800 for detecting rain and/or snow (i.e., the rain/snow detection 330 shown in FIG. 4), which may be causing lane marking misdetection. The method 800 provides results to the controller 201. The controller 201 uses the results to isolate fault (i.e., to diagnose a root cause of lane marking misdetection) and provides mitigation strategies according to Table 1.

At 802, the method 800 loads a model trained to detect rain and/or snow using machine learning (e.g., a CNN model) to process data from a sensor (e.g., images from a front camera that has the windshield of the vehicle in field of view). For example, the trained model can detect movement of windshield wipers, a combination of blurry and relatively clear images, and so on captured by the sensor. These can be indicia of rain and/or snow. For example, distinction between rain and snow can be made by further combining ambient temperature with these indicia. For example, the method 800 may select images and temperature data stored in the cyclic buffer before and after lane marking misdetection as explained above with reference to FIG. 6 for such processing.

At 804, the method 800 determines a number of image with and without the indication of rain and/or snow. At 806, the method 800 calculates a ratio of images with the indication of rain and/or snow to a total number of images processed. At 808, if the ratio is greater than or equal to a predetermined threshold, the method 800 determines that the scenario is rain or snow. Alternatively, at 810, if the ratio is less than the predetermined threshold, the method 800 determines that the scenario is not rain or snow.

Figure 13:
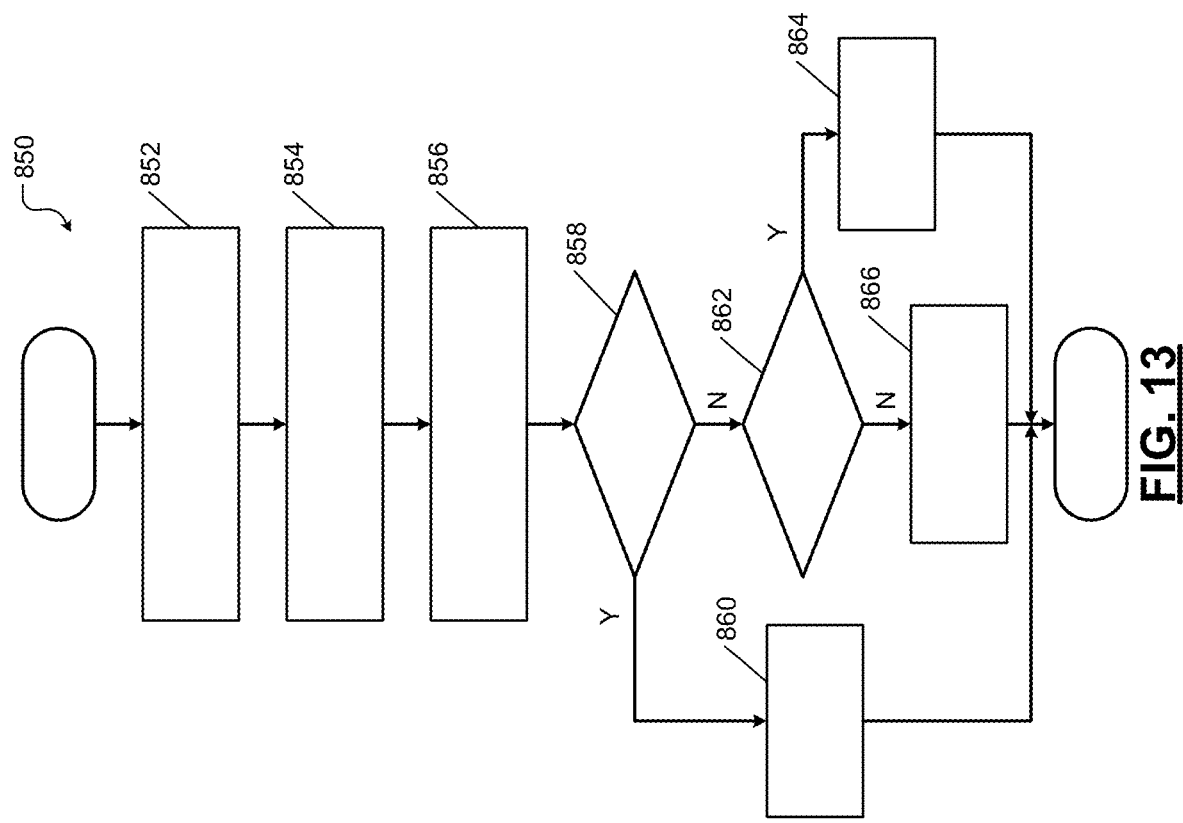
FIG. 13 shows a method for detecting glare and/or shade that can cause misdetection of lane markings.

FIG. 13 shows a method 850 for detecting glare and/or shade (i.e., the glare and/or shade detection 332 shown in FIG. 4), which may be causing lane marking misdetection. The method 850 provides results to the controller 201. The controller 201 uses the results to isolate fault (i.e., to diagnose a root cause of lane marking misdetection) and provides mitigation strategies according to Table 1.

At 852, the method 850 creates a histogram of pixels in an area of interest from images captured by a sensor (e.g., images from a front camera that has the windshield of the vehicle in field of view). For example, the method 850 may select images stored in the cyclic buffer before and after lane marking misdetection as explained above with reference to FIG. 6 for such processing. Note that although the method 850 uses histograms as described below, the method 850 can alternatively use other machines learning methods employing image classification (e.g., using a model trained to directly classify whether an image contains glare or shade) or object detection (e.g., using a model trained to detect glare or shade in images).

At 854, the method 850 determines a number of pixels N1 with intensity greater than or equal to a first value T1, where both N1 and T1 are calibratable. At 856, the method 850 determines a number of pixels N2 with intensity less than or equal to a second value T2, where both N2 and T2 are also calibratable. At 858, the method 850 determines if N1 is greater than or equal to a first threshold $Th_1$, which is calibratable. If N1 is greater than or equal to a first threshold $Th_1$, at 860, the method 850 detects presence of glare in the lane detection area, and the method 850 ends. Alternatively, if N1 is less than the first threshold $Th_1$, at 862, the method 850 determines if N2 is greater than or equal to a second threshold $Th_2$, which is also calibratable. If N2 is greater than or equal to a second threshold $Th_2$, at 864, the method 850 detects presence of shade in the lane detection area, and the method 850 ends. If N2 is less than the second threshold $Th_2$, at 866, the method 850 determines absence of glare and shade in the lane detection area, and the method 850 ends.

Figure 14:
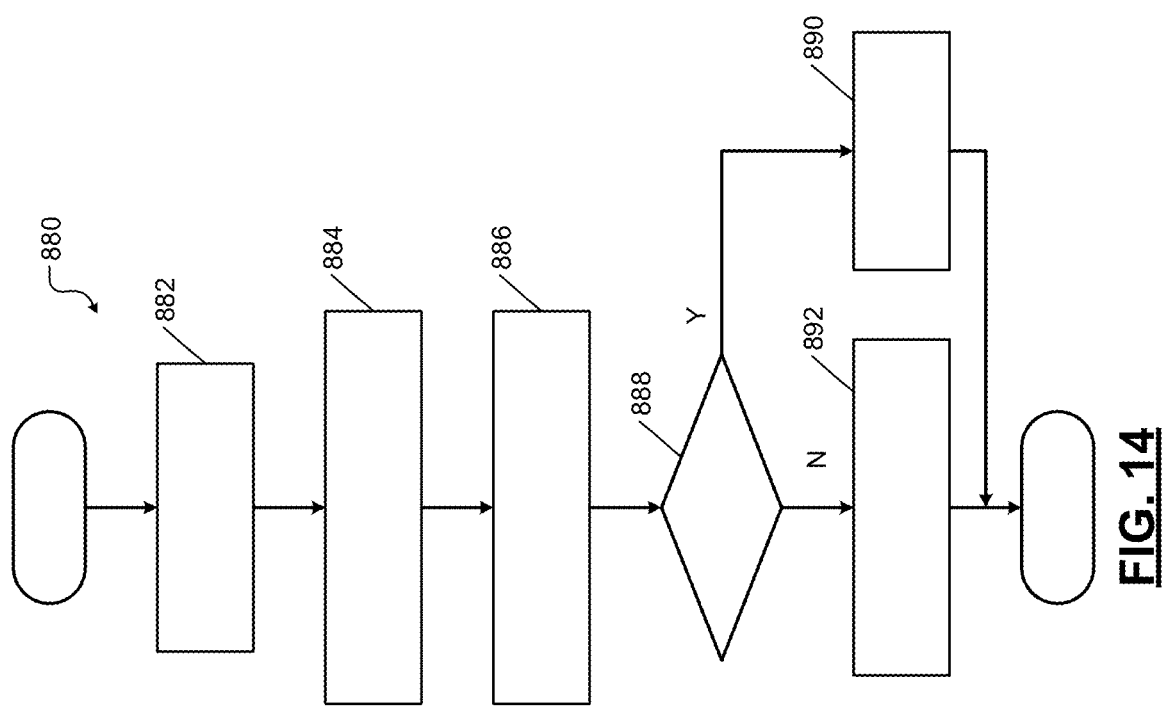
FIG. 14 shows a method for detecting construction zone that can cause misdetection of lane markings.

FIG. 14 shows a method 880 for detecting construction zone (i.e., the construction zone detection 336 shown in FIG. 4), which may be causing lane marking misdetection. For example, the method 880 may select images stored in the cyclic buffer before and after lane marking misdetection as explained above with reference to FIG. 6 for processing. Note that although the method 880 uses object detection as described below, the method 880 can alternatively use other machine learning methods employing image classification (e.g., using a model trained to directly classify whether an image contains construction zone or not). The method 880 provides results to the controller 201. The controller 201 uses the results to isolate fault (i.e., to diagnose a root cause of lane marking misdetection) and provides mitigation strategies according to Table 1.

At 882, the method 880 detects construction cones, barricades, and/or other signs (collectively called constructions objects) in images captured by a sensor (e.g., images from a camera onboard the vehicle). At 884, the method 880 determines a number of images with constructions objects. At 886, the method 880 calculates a ratio of the number of images with constructions objects to a total number of images. At 888, the method 880 determines if the ratio is greater than or equal to a threshold, which is calibratable. If the ratio is greater than or equal to the threshold, at 890, the method 880 determines that the vehicle is in a construction zone. Alternatively, if the ratio is less than the threshold, at 892, the method 880 determines that the vehicle is not in a construction zone.

Figure 15:
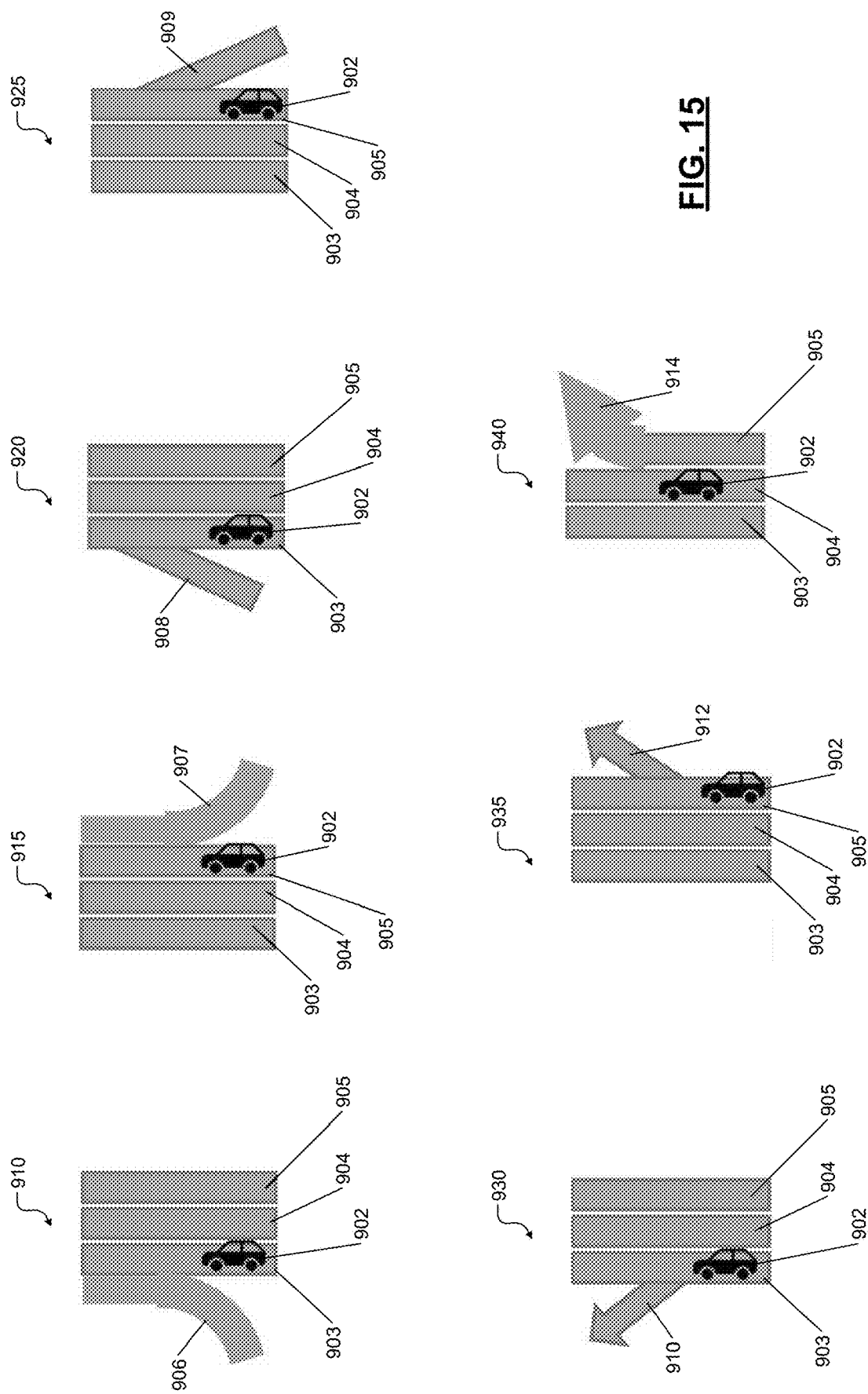
FIGS. 15 and 16 show a method for detecting exit, entrance, and/or splitting of a lane that can cause misdetection of lane markings.
Figure 16:
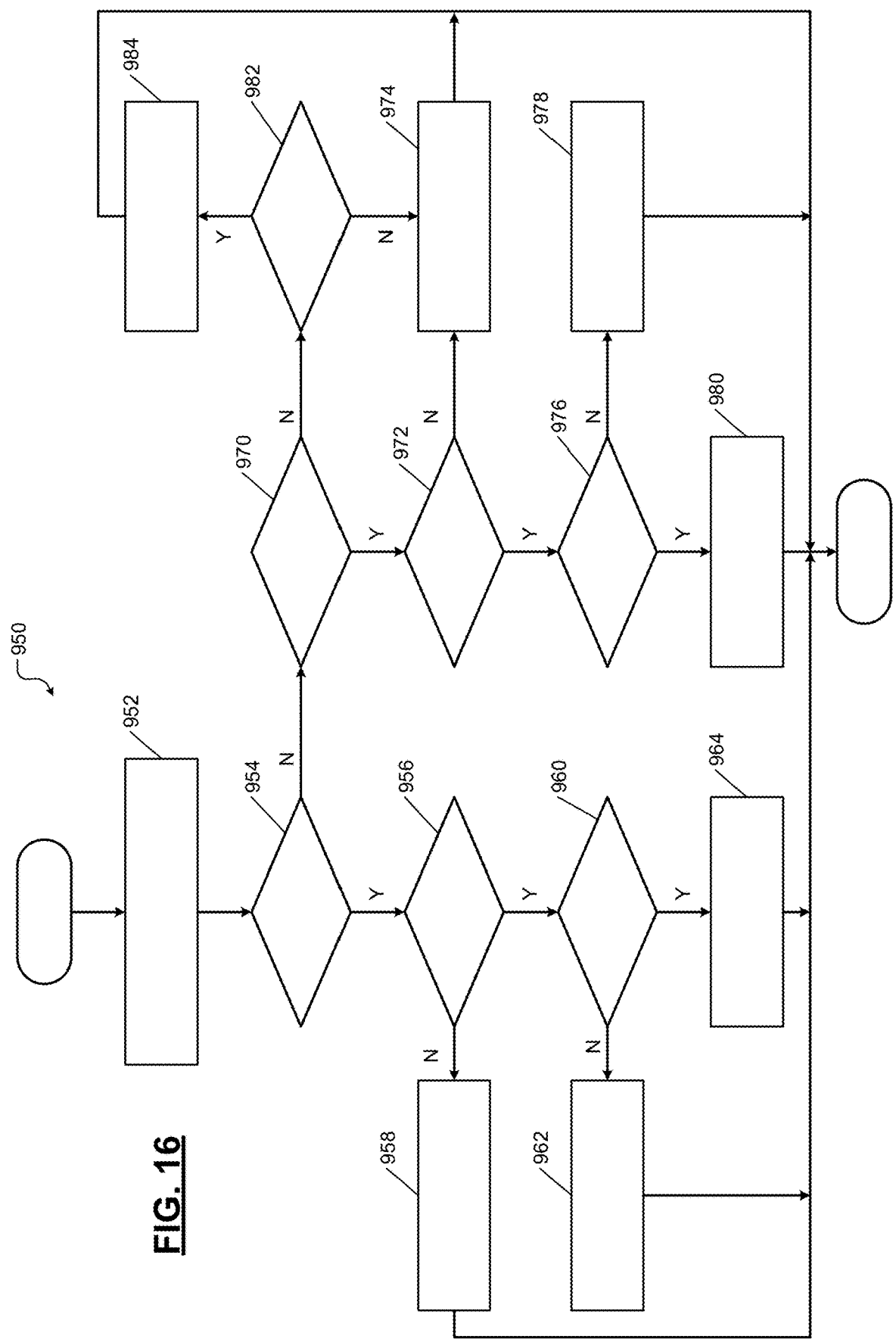

FIGS. 15 and 16 show a method 950 for detecting exit, entrance, and/or splitting of a lane (i.e., the scenario collectively shown as exit/entrance/split detection 340 shown in FIG. 4), which may be causing lane marking misdetection. For example, the method 950 may select images stored in the cyclic buffer before and after lane marking misdetection as explained above with reference to FIG. 6 for processing. Before describing the method 950 shown in FIG. 16, various examples of lane exit, entrance, and/or split scenarios (i.e., various ways in which the lane configuration of the roadway can change) are shown and described with reference to FIG. 15.

In FIG. 15, for example, at 910, a vehicle 902 is in the left most lane (lane 1) 903 with two more lanes 904, 905 to the right of the lane 903, and a lane 906 is added to the left of the lane 903. The lane 906 continues as an independent lane without merging with the lane 903. Thus, before the addition of the lane 906, there were 3 lanes, and the vehicle 902 was in lane 1; and after the addition of the lane 906, there are now 4 lanes, and the vehicle 902 is now in lane 2 (lane 903), with the left most lane now being the added lane 906, assuming that the vehicle 902 stays in the lane 903. This can be expressed using the following nomenclature or notation: the lane index is 1, 2, 2; and the number of lanes is 3, 4, 4. That is, the vehicle was in lane 1 (before the lane 906 was added), is now is lane 2 (after the lane 906 is added), and continues to be in lane 2 (after the lane 906 is added); and the number of lanes were 3 (before the lane 906 was added), are now 4 (after the lane 906 is added), and continue to be 4 (after the lane 906 is added). The same nomenclature for the lane index and number of lanes is used below without describing again for brevity.

At 915, the vehicle 902 is in the right most lane (lane 3) 905 with two more lanes 904, 903 to the left of the lane 905, and a lane 907 is added to the right of the lane 905. The lane 907 continues as an independent lane without merging with the lane 905. Thus, before the addition of the lane 907, there were 3 lanes, and the vehicle 902 was in lane 3; and after the addition of the lane 907, there are now 4 lanes, and the vehicle 902 is now still in lane 3 (lane 905), with the right most lane now being the added fourth lane 907, assuming that the vehicle 902 stays in the lane 905. This can be expressed using the following nomenclature or notation: the lane index is 3, 3, 3; and the number of lanes is 3, 4, 4.

At 920, the vehicle 902 is in the left most lane (lane 1) 903 with two more lanes 904, 905 to the right of the lane 903, and a lane 908 is an exit/entrance lane to the left of the lane 903. The lane 908 does not continue independently but merges with the lane 903. Thus, before the lane 908, there were 3 lanes, and the vehicle 902 was in lane 1; with the lane 908, there are 4 lanes, and the vehicle 902 is now in lane 2 (lane 903); and after the lane 908 discontinues (i.e., merges into the lane 903), the vehicle 902 is again in lane 1 (lane 903), assuming that the vehicle 902 stays in the lane 903; and the number of lanes is again 3. This can be expressed using the following nomenclature or notation: the lane index is 1, 2 (during the merger of the lane 908 into the lane 903), 1; and the number of lanes is 3, 4, 3 (4 temporarily while the lane 908 merges into the lane 903).

At 925, the vehicle 902 is in the right most lane (lane 3) 903 with two more lanes 904, 903 to the left of the lane 905, and a lane 909 is an exit/entrance lane to the right of the lane

905. The lane 909 does not continue independently but merges with the lane 905. Thus, before the lane 909, there were 3 lanes, and the vehicle 902 was in lane 3; with the lane 909, there are 4 lanes, and the vehicle 902 is now still in lane 3 (lane 905); and after the lane 909 discontinues (i.e., merges into the lane 905), the vehicle 902 is again still in lane 3 (lane 905), assuming that the vehicle 902 stays in the lane 905; and the number of lanes is again 3. This can be expressed using the following nomenclature or notation: the lane index is 3, 3, 3; and the number of lanes is 3, 4, 3 (4 temporarily while the lane 909 merges into the lane 905).

Similarly, at 930, a lane 910 exits from the lane 903, but the lane 903 continues. The lane index is 1, 2, 1; and the number of lanes is 3, 4, 3. At 935, a lane 912 exits from the lane 905, but the lane 905 continues. The lane index is 3, 3, 3; and the number of lanes is 3, 4, 3.

At 940, a lane split scenario is shown. The vehicle 902 is in the center lane 904 (lane 2). The right most lane 905 (lane 3) splits into a lane 914. After the split, the lane 905 discontinues, and only two lanes 904, 903 continue. Assuming the vehicle 902 stays in the lane 905, the lane index is 2, 2, 2; and the number of lanes is 3, 4, 2 (4 temporarily while the lane 914 split from the lane 905). Similarly, the left most lane 903 can also split. Many additional lane change scenarios (i.e., ways in which the lane configuration of the roadway can change) are possible and can be understood by one skilled in the art.

FIG. 16 shows a method 950 for detecting exit, entrance, and/or splitting of a lane (collectively shown as exit/entrance/split detection 340 in FIG. 4), which may be causing lane marking misdetection. The method 950 can detect changes in the lane configuration of a roadway as follows. For example, the method 950 may select data regarding the number of lanes L and lane index LI stored in the cyclic buffer before and after lane marking misdetection as explained above with reference to FIG. 6 for such processing.

At 952, the method 950 loads the data regarding the number of lanes L and lane index LI for the vehicle (i.e., where the vehicle is being driven). At 954, based on the data, the method 950 determines if the vehicle is in the right most lane. If the vehicle is in the right most lane, at 956, the method 950 determines if values of L and/or LI have changed. If the values of L and/or LI have not changed, at 958, the method 950 determines that lane marking misdetection is not caused by a lane exit/entrance/split scenario, and the method 950 ends.

If the values of L and/or LI have changed, at 960, the method 950 determines if the values of L and/or LI have recovered (i.e., reverted to values before the change). If the values of L and/or LI have not recovered, at 962, the method 950 determines that a lane is added to the right of the vehicle, and the method 950 ends. If the values of L and/or LI have recovered, at 964, the method 950 determines that a lane exit/entrance scenario occurred on the right side of the vehicle, and the method 950 ends.

At 954, if the vehicle is not in the right most lane, the method 950 proceeds to 970. At 970, the method 950 determines if the vehicle is in the left most lane. If the vehicle is in the left most lane, at 972, the method 950 determines if the value of LI has changed. If the value of LI has not changed, at 974, the method 950 determines that lane marking misdetection is not caused by a lane exit/entrance/split scenario, and the method 950 ends. If the value of LI has changed, at 976, the method 950 determines if the value of LI has recovered (i.e., reverted to the value before the change). If the value of LI has not recovered, at 978, the method 950 determines that a lane is added to the left of the vehicle, and the method 950 ends. If the value of LI has recovered, at 980, the method 950 determines that a lane exit/entrance scenario occurred on the left side of the vehicle, and the method 950 ends.

At 970, if the vehicle is not in the left most lane, the method 950 proceeds to 982. At 982, the method 950 determines if L has changed. If L has not changed, the method 950 proceeds to 974. If L has changed, at 984, the method 950 determines that a lane split scenario occurred, and the method 950 ends. The above determinations made by the method 950 are used by the controller 201 in determining a root cause of lane marking misdetection.

Figure 17:
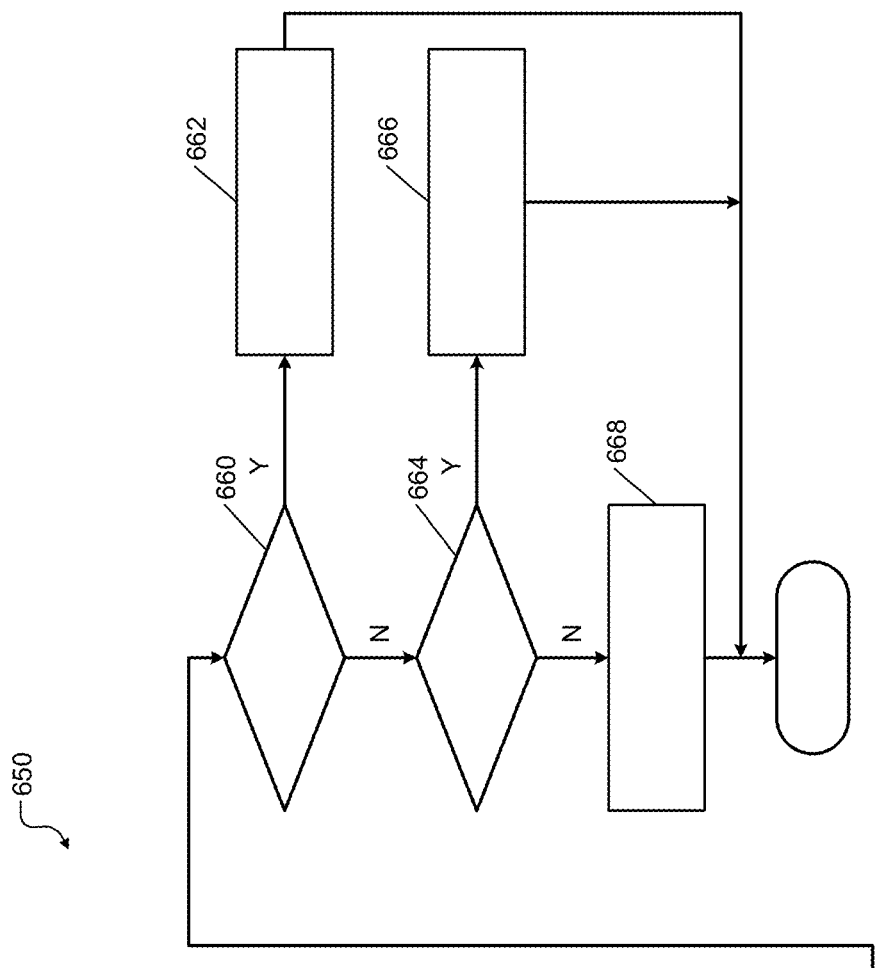
FIG. 17 shows a method for detecting an obstacle for lane marking detection.
Figure 17:
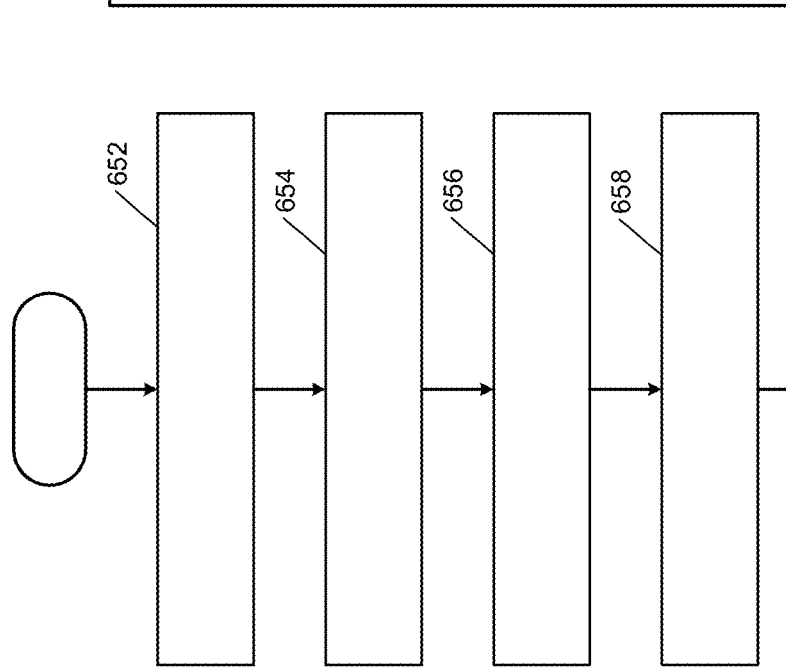

FIG. 17 shows a method 650 for detecting an obstacle for lane marking detection (e.g., an obstruction posed by another vehicle in front the host vehicle, which is shown as obstacle detection 334 in FIG. 4), which may be causing lane marking misdetection. For example, the method 650 may select images stored in the cyclic buffer before and after lane marking misdetection as explained above with reference to FIG. 6 for processing. The method 650 provides results to the controller 201. The controller 201 uses the results to isolate fault (i.e., to diagnose a root cause of lane marking misdetection) and provides mitigation strategies according to Table 1.

At 652, the method 650 loads position information of first N objects detected by long range radar (e.g., shown in the navigation sensors 206 in FIG. 3). At 654, the method 650 loads position information of the first N objects detected by a camera (e.g., shown in the navigation sensors 206 in FIG. 3) typically used for sensing lane markings. At 656, the method 650 counts a number of data points D1 indicating presence of a relatively large vehicle (e.g., a truck) within a predetermined distance in front of the host vehicle, where D1 and the distance are calibratable. At 658, the method 650 counts a number of data points D2 indicating presence of a relatively small vehicle (e.g., a sedan) within a predetermined distance in front of the host vehicle, where D2 and the distance are calibratable.

At 660, the method 650 determines if D1 is greater than or equal to a predetermined number N1, which is calibratable. If D1 is greater than or equal to the predetermined number N1, at 662, the method 650 indicates that presence of a large vehicle in front of the host vehicle is detected, and the method 650 ends.

If D1 is less than N1, at 664, the method 650 determines if D2 is greater than or equal to a predetermined number N2, which is also calibratable. If D2 is greater than or equal to the predetermined number N2, at 666, the method 650 indicates that presence of a small vehicle in front of the host vehicle is detected, and the method 650 ends.

If D2 is less than N2, at 668, the method 650 determines that there is no vehicle in front of the host vehicle (i.e., there is no obstacle in the field of view of the camera used for sensing lane markings), and the method 650 ends. The results provided by the method 650 help in eliminating an obstacle in front of the vehicle as a possible cause of lane marking misdetection.

Figure 18:
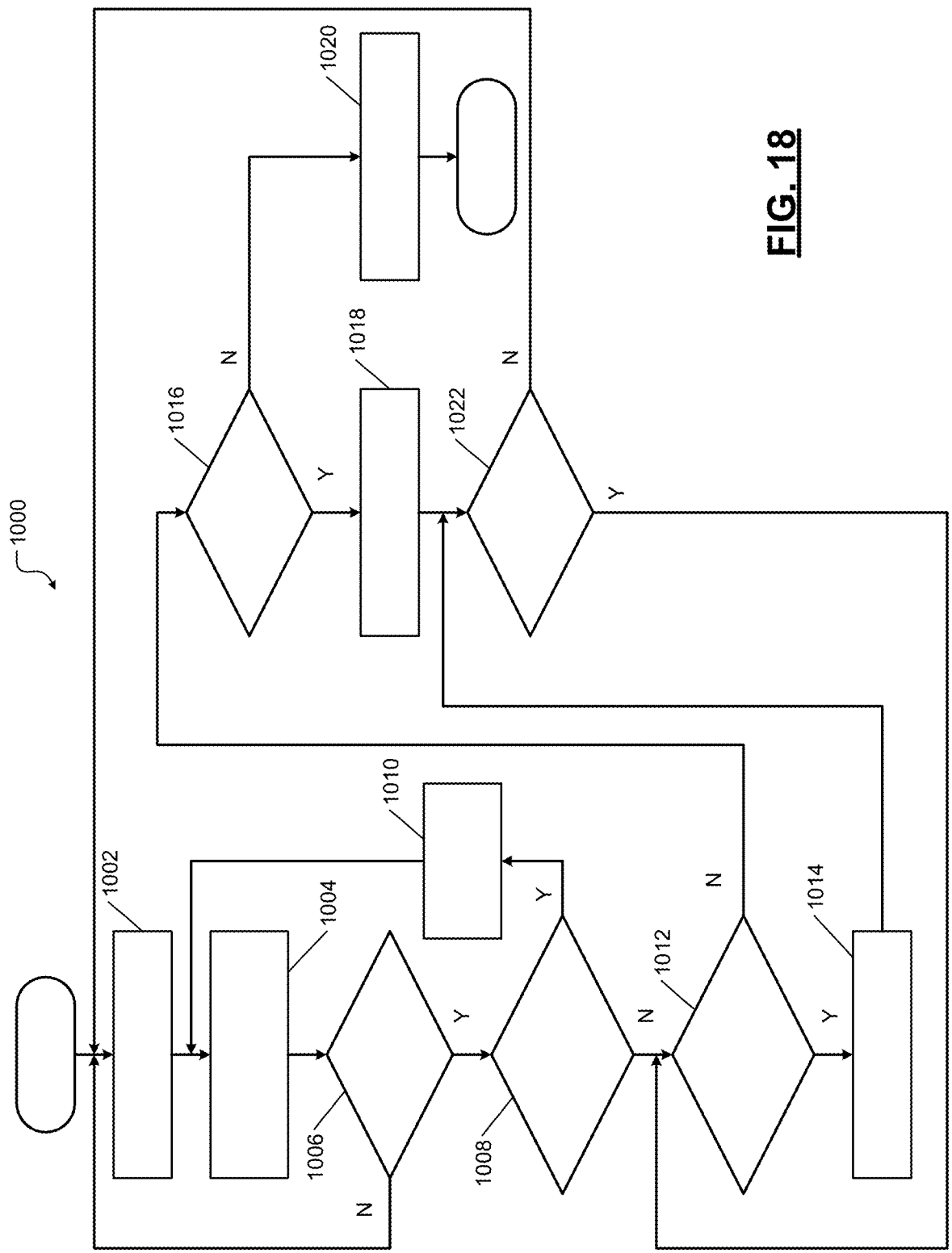
FIG. 18 shows an example of a method of using the system of FIG. 3 and providing one or more mitigation strategies in the vehicle.

FIG. 18 shows an example of a method 1000 of using the system 200 and performing one or more mitigation strategies in a vehicle according to the present disclosure. The method 1000 can be performed using a combination of the controller 201 in the vehicle and one or more of the servers 130, where the combination utilizes the data stored in the cyclic buffer in the controller 201, and where each of the controller 201 and the one or more servers 130 performs portions of the methods described above.

At 1002, the method 1000 waits fora predetermined amount of time T, which is calibratable. After the time predetermined amount of T elapses, at 1004, the method 1000 receives scenario information (e.g., whether the scenario is of the first or second type). In some examples, the scenario information may also be received from other vehicles (e.g., by communication through cloud and the servers 130) that are in the vicinity of the host vehicle and that may also be experiencing lane misdetection. At 1006, the method 1000 determines if lane detection is challenging (e.g., due heavy rain or snow). The method 1000 returns to 1002 if lane detection is not challenging. If lane detection is challenging, at 1008, the method 1000 determines if a lane detection model trained to detect lane markings in the scenario (e.g., one of the methods for the scenario described above) is available. If a lane detection model trained to detect lane markings in the scenario is available, at 1010, the method 1000 uses the lane detection model trained to detect lane markings in the scenario, which may be available in the controller 201 and/or in one of the servers 130. The results are used by the controller 201 as described above.

If a lane detection model trained to detect lane markings in the scenario is unavailable, at 1012, the method 1000 determines if it is possible for the host vehicle to follow a vehicle ahead of the host vehicle. If possible, at 1014, the method 1000 allows the host vehicle to follow a vehicle ahead of the host vehicle. If it is not possible to follow a vehicle ahead of the host vehicle (e.g., if the vehicle ahead of the host vehicle is relatively very far from the host vehicle), at 1016, the method 100 determines if a new trajectory (e.g., a different path determined by the automated driving subsystem 204 or a trajectory uploaded by another vehicle in the vicinity of the host vehicle) is available. If a new trajectory is available, at 1018, the method 1000 follows the trajectory (i.e., the vehicle is driven along the available trajectory). If a new trajectory is unavailable, at 1020, the method 1000 alerts an occupant of the vehicle to take over control of the vehicle (e.g., by providing a message to the driver of the vehicle via the infotainment subsystem 202 shown in FIG. 2), and the method 1000 ends.

After 1018 and 1014, the method 1000 proceeds to 1022. At 1022, the method 1000 determines if the scenario is still (i.e., continues to be) challenging. The method 1000 returns to 1002 if the scenario is not or no longer challenging. The method returns to 1012 if the scenario is still challenging.

Note that the example of the method 1000 assumes that a single challenging scenario occurs at a time. However, if any other challenging scenario occurs at the same time, the method 1000 informs the driver of the vehicle of the prevailing challenging scenarios and alerts the driver to take over control of the vehicle (e.g., by providing one or more messages to the driver via the infotainment subsystem 202 shown in FIG. 2).

The foregoing description is merely illustrative in nature and is not intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between subsystems, controllers, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information, but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, including the definitions below, the term "controller" may be replaced with the term "circuit." The term "controller" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The controller may include one or more interface circuits. In some examples, the interface circuits may include wired or wireless interfaces that are connected to a local area network (LAN), the Internet, a wide area network (WAN), or combinations thereof. The functionality of the controller of the present disclosure may be distributed among multiple controllers that are connected via interface circuits. For example, the various subsystems of the present disclosure may comprise respective controllers. For example, multiple controllers may allow load balancing. In a further example, a server (also known as remote, or cloud) controller may accomplish some functionality on behalf of a client controller in the vehicles.

The term code, as used above, may include software, firmware, and/or microcode, and may refer to programs, routines, functions, classes, data structures, and/or objects. The term shared processor circuit encompasses a single processor circuit that executes some or all code from multiple controllers. The term group processor circuit encompasses a processor circuit that, in combination with additional processor circuits, executes some or all code from one or more controllers. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple controllers. The term group memory circuit encompasses a memory circuit that, in combination with additional memories, stores some or all code from one or more controllers.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general-purpose computer to execute one or more particular functions embodied in computer programs. The functional blocks, flowchart components, and other elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation) (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C #, Objective-C, Swift, Haskell, Go, SQL, R, Lisp, Java®, Fortran, Perl, Pascal, Curl, OCaml, Javascript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

What is claimed is:

1. A system for a vehicle comprising:
    a plurality of sensors onboard the vehicle, wherein a first sensor of the plurality of sensors is configured to detect lane markings on a roadway; and
    a controller configured to:
        store data from the plurality of sensors; and
        in response to receiving an indication indicating a misdetection of lane markings on the roadway based on data received from the first sensor:
            execute in parallel a plurality of procedures configured to detect a plurality of causes for the misdetection of lane markings, respectively, based on the stored data;
            isolate one of the causes as a root cause for the misdetection of lane markings; and
            provide a response for mitigating the misdetection of lane markings on the roadway based on the root cause for the misdetection of lane markings.

2. The system of claim 1 wherein the procedures are configured to detect whether the misdetection of lane markings is caused by any of:
    the first sensor being faulty;
    absence of lane markings on the roadway;
    presence of rain or snow obscuring lane markings on the roadway;
    presence of glare or shade obscuring lane markings on the roadway;
    presence of an obstacle in a field of view of the first sensor;
    presence of construction on the roadway;
    a change in lane configuration of the roadway; and
    the roadway being unpaved.

3. The system of claim 1 wherein the response includes following a second vehicle ahead of the vehicle, informing an occupant of the vehicle to take over control of driving the vehicle, switching to a second sensor of the plurality of sensors for lane marking detection, and/or scheduling service.

4. The system of claim 1 wherein one of the procedures executed by the controller is configured to:
    process an image captured by the first sensor;
    perform clustering and filtering of pixels in the image;
    perform first and second curve fittings on the filtered pixels; and
    determine whether a lane marking exists on the roadway based on the second curve fitting.

5. The system of claim 1 wherein one of the procedures executed by the controller is configured to:
    process images captured by two sensors of the plurality of sensors;
    determine, for each of the two sensors, number of images with and without lane markings;
    calculate, for each of the two sensors, a ratio of the number of images with or without lane markings to a total number of processed images; and
    determine whether a lane marking exists on the roadway based on the ratios for the two sensors.

6. The system of claim 1 wherein one of the procedures executed by the controller is configured to confirm whether the first sensor is faulty by comparing a raw age of the roadway captured by the first sensor to a raw image of the roadway captured by a second sensor of the plurality of sensors.

7. The system of claim 1 wherein one of the procedures executed by the controller is configured to confirm whether the first sensor is faulty by comparing an objected detected in an image of the roadway captured by the first sensor to an object detected in an image of the roadway captured by a second sensor of the plurality of sensors.

8. The system of claim 1 wherein one of the procedures executed by the controller is configured to detect whether the roadway is unpaved based on images captured by the first sensor, map information about the roadway, and data from an inertial measurement unit in the vehicle.

9. The system of claim 1 wherein one of the procedures executed by the controller is configured to detect presence of rain or snow in images captured by the first sensor using a machine learning model.

10. The system of claim 1 wherein one of the procedures executed by the controller is configured to detect presence of gyro or shade in images captured by the first sensor based on intensity of pixels in the images.

11. The system of claim 1 wherein one of the procedures executed by the controller is configured to detect presence of construction on the roadway based on construction objects detected in images captured by one of the plurality of sensors.

12. The system of claim 1 wherein one of the procedures executed by the controller is configured to detect a change in lane configuration of the roadway by detecting at least one of a change in number of lanes in the roadway and a change in a relationship between the number of lanes and a lane occupied by the vehicle.

13. The system of claim 1 wherein one of the procedures executed by the controller is configured to determine, based on images captured by a second sensor of the plurality of sensors and data received from a third sensor of the plurality of sensors, whether a second vehicle is ahead of the vehicle within a predetermined distance from the vehicle and a size of the second vehicle.

14. The system of claim 13 wherein one of the procedures executed by the controller is configured to determine whether to follow the second vehicle based on the predetermined distance.

15. The system of claim 13 wherein one of the procedures executed by the controller is configured to determine whether to drive the vehicle on another trajectory in response to the predetermined distance being greater than a predetermined threshold.

16. A method for a vehicle comprising:
    storing data from a plurality of sensors onboard the vehicle;
    receiving an indication indicating a misdetection of lane markings on a roadway based on data received from a first sensor of the plurality of sensors;
    in response to receiving the indication, executing in parallel a plurality of procedures configured to detect a plurality of causes for the misdetection of lane markings, respectively, based on the stored data;
    identifying one of the causes as a root cause for the misdetection of lane markings; and
    providing a response for mitigating the misdetection of lane markings on the roadway based on the root cause for the misdetection of lane markings,
    wherein the response includes following a second vehicle ahead of the vehicle, informing an occupant of the vehicle to take over control of driving the vehicle, switching to a second sensor of the plurality of sensors for lane marking detection, and/or scheduling service.

17. The method of claim 16 further comprising detecting, using the procedures, whether the misdetection of lane markings is caused by any of:
    the first sensor being faulty;
    absence of lane markings on the roadway;
    presence of rain or snow obscuring lane markings on the roadway;
    presence of glare or shade obscuring lane markings on the roadway;
    presence of an obstacle in a field of view of the first sensor;
    presence of construction on the roadway;
    a change in lane configuration of the roadway; and
    the roadway being unpaved.

18. The method of claim 16 further comprising:
    processing an image captured by the first sensor;
    performing clustering and filtering of pixels in the image;
    performing first and second curve fittings on the filtered pixels; and
    determining whether a lane marking exists on the roadway based on the second curve fitting.

19. The method of claim 16 further comprising:
    processing images captured by two sensors of the plurality of sensors;
    determining, for each of the two sensors, number of images with and without lane markings;
    calculating, for each of the two sensors, a ratio of the number of images with or without lane markings to a total number of processed images; and
    determining whether a lane marking exists on the roadway based on the ratios for the two sensors.

20. The method of claim 16 further comprising confirming whether the first sensor is faulty by:
    comparing a raw image of the roadway captured by the first sensor to a raw image of the roadway captured by the second sensor of the plurality of sensors; or
    comparing an objected detected in an image of the roadway captured by the first sensor to an object detected in an image of the roadway captured by the second sensor of the plurality of sensors.

* * * * *